US009876827B2

(12) United States Patent
Chew et al.

(10) Patent No.: US 9,876,827 B2
(45) Date of Patent: Jan. 23, 2018

(54) SOCIAL NETWORK COLLABORATION SPACE

(75) Inventors: Chee H. Chew, Redmond, WA (US); Vivek P. Gundotra, Santa Clara, CA (US)

(73) Assignee: GOOGLE LLC, Mountain View, CA (US)

(*) Notice: Subject to any disclaimer, the term of this patent is extended or adjusted under 35 U.S.C. 154(b) by 614 days.

(21) Appl. No.: 13/976,829

(22) PCT Filed: Dec. 20, 2011

(86) PCT No.: PCT/US2011/066194
§ 371 (c)(1),
(2), (4) Date: Oct. 1, 2013

(87) PCT Pub. No.: WO2012/092025
PCT Pub. Date: Jul. 5, 2012

(65) Prior Publication Data
US 2014/0019882 A1 Jan. 16, 2014

Related U.S. Application Data

(60) Provisional application No. 61/427,454, filed on Dec. 27, 2010.

(51) Int. Cl.
*G06F 3/0481* (2013.01)
*H04L 29/06* (2006.01)
(Continued)

(52) U.S. Cl.
CPC ............ *H04L 65/40* (2013.01); *G06Q 10/10* (2013.01); *G06Q 50/01* (2013.01); *H04L 12/1822* (2013.01); *H04L 51/32* (2013.01)

(58) Field of Classification Search
CPC ........ H04L 65/40; G06Q 10/10; G06F 3/0481
See application file for complete search history.

(56) References Cited

U.S. PATENT DOCUMENTS

2005/0114527 A1 5/2005 Hankey et al.
2006/0242581 A1 10/2006 Manion et al.
(Continued)

FOREIGN PATENT DOCUMENTS

KR 10-2007-0043949 A 4/2007
WO 2009/146130 12/2009
WO 2011/146225 A1 11/2011

OTHER PUBLICATIONS

International Preliminary Report on Patentability for PCT/US2011/066194 dated Jul. 11, 2013.
(Continued)

*Primary Examiner* — Andrea Leggett
(74) *Attorney, Agent, or Firm* — RMCK Law Group, PLC

(57) ABSTRACT

A method, at a client device associated with a first subscriber of a multiplicity of subscribers to a social network, includes presenting a social network page associated with a second subscriber of the multiplicity of subscribers to the social network, the social network page including a link to an online collaboration space associated with the second subscriber; receiving a user input activating the link, the user input made by the first subscriber of the multiplicity of subscribers; and in response to the user input activating the link, presenting the online collaboration space and adding the first subscriber as a participant to the online collaboration space.

30 Claims, 20 Drawing Sheets

(51) Int. Cl.
*G06Q 10/10* (2012.01)
*G06Q 50/00* (2012.01)
*H04L 12/58* (2006.01)
*H04L 12/18* (2006.01)

(56) References Cited

U.S. PATENT DOCUMENTS

| | | | |
|---|---|---|---|
| 2008/0075118 A1* | 3/2008 | Knight | H04L 12/1822 370/474 |
| 2008/0168154 A1* | 7/2008 | Skyrm | H04L 65/601 709/218 |
| 2008/0195956 A1 | 8/2008 | Baron et al. | |
| 2008/0222295 A1 | 9/2008 | Robinson et al. | |
| 2010/0241971 A1* | 9/2010 | Zuber | G06Q 10/10 715/753 |
| 2012/0096352 A1* | 4/2012 | Maor | H04L 51/32 715/706 |
| 2012/0110096 A1 | 5/2012 | Smarr et al. | |
| 2012/0324001 A1* | 12/2012 | Leacock | H04L 51/043 709/204 |

OTHER PUBLICATIONS

International Search Report and Written Opinion for PCT/US2011/066194 dated Sep. 24, 2012.

* cited by examiner

SOCIAL NETWORK COLLABORATION SPACE

TECHNICAL FIELD

The disclosed examples relate generally to social networking. More particularly, the disclosed examples relate to an online collaboration space in a social network.

BACKGROUND

Computers and mobile devices, such as mobile phones, have become increasingly interconnected due to the widespread availability of wired and wireless connections to communications networks such as the Internet. This interconnectivity has enabled ways for people to communicate with people far and near and to maintain social and professional bonds.

A popular means of communication that takes advantage of the interconnectivity are web-based social network applications. In such social network applications, a user can post a variety of comments, from short messages or comments about his status or activities or just about anything, to photos and videos and articles of interest. Users can find other users that they know or with whom they share interests and become followers of each others' postings. Some social network applications also allow their users to send private messages to each other and/or to chat with each other in real time. As such, social network applications offer their users opportunities to communicate and collaborate with each other.

SUMMARY

Some examples provide a system, computer readable storage medium storing instructions, or a computer-implemented method for, at a client device associated with a first subscriber of a multiplicity of subscribers to a social network: presenting a social network page associated with a second subscriber of the multiplicity of subscribers to the social network, the social network page including a link to an online collaboration space associated with the second subscriber; receiving a user input activating the link, the user input made by the first subscriber of the multiplicity of subscribers; and in response to the user input activating the link, presenting the online collaboration space and adding the first subscriber as a participant of the online collaboration space.

Some examples provide a system, computer readable storage medium storing instructions, or a computer-implemented method for sending to a client system for display a social network page associated with a first subscriber of a multiplicity of social network subscribers, the social network page including a link to an online collaboration space associated with the first subscriber; receiving a request to activate the link, the request associated with a second subscriber of the multiplicity of subscribers; and in response to the request, adding the second subscriber as a participant of the online collaboration space and sending to a client system of the second subscriber information from the online collaboration space for display in a user interface of the online collaboration space.

Some examples provide a system that includes one or more processing units; memory storing one or more programs to be executed by the one or more processing units; and for each respective subscriber of a multiplicity of subscribers to a social network, a social network page, the social network page including a link to an online collaboration space associated with the respective subscriber; wherein the social network page of the respective subscriber is accessible to at least a subset of the other subscribers of the social network; and wherein activation of the online collaboration space link by a subscriber adds the subscriber as a participant of the online collaboration space and causes information from the online collaboration space to be sent to a client device of the subscriber for display in a user interface of the online collaboration space.

BRIEF DESCRIPTION OF THE DRAWINGS

Like reference numerals refer to corresponding parts throughout the drawings.

DESCRIPTION OF EXAMPLES

Overview

Figure 1:
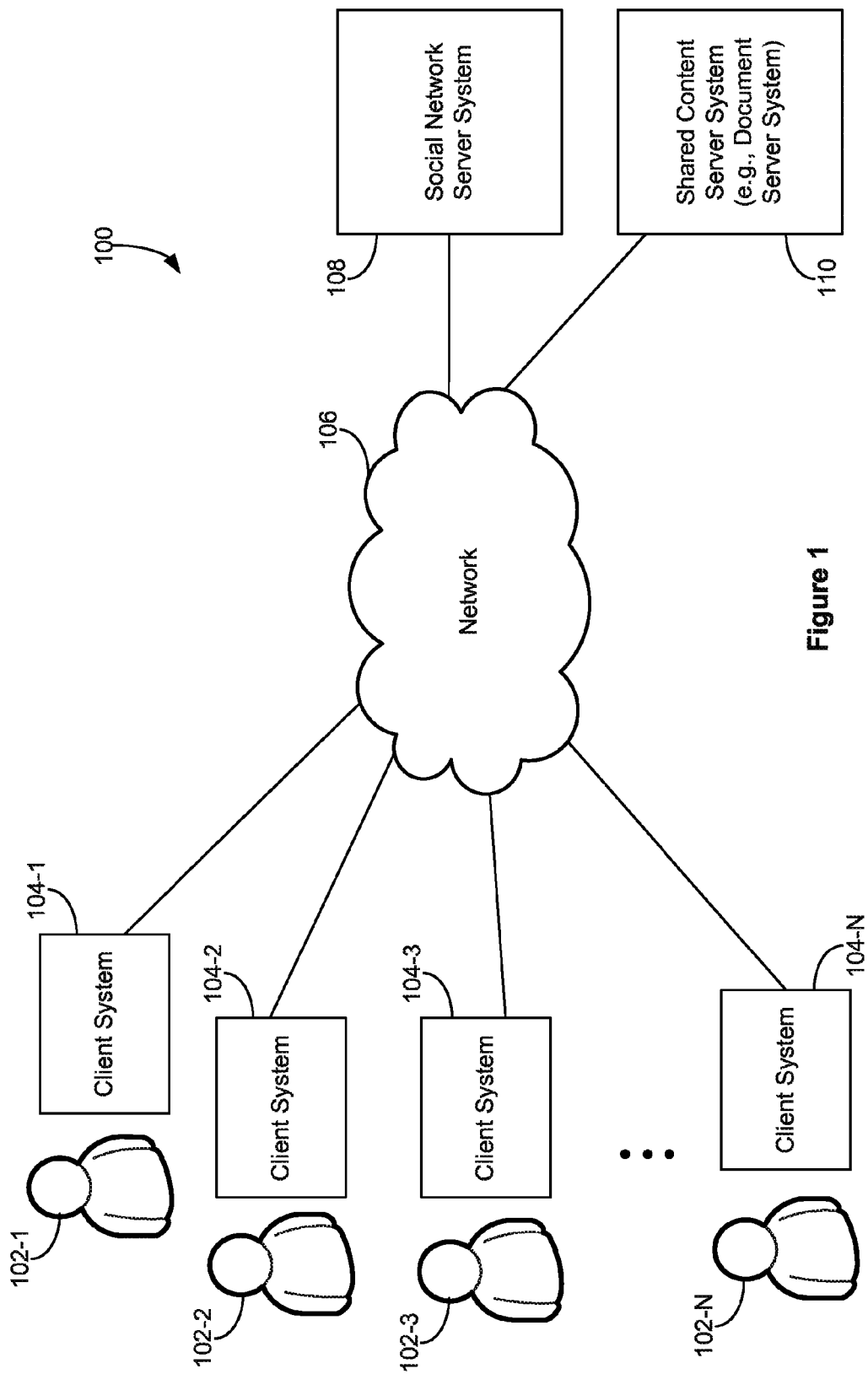
FIG. 1 is a block diagram of a network architecture of a social network in accordance with some examples.

Friends, family members, or other individuals who wish to socialize or otherwise communicate may not always be in the same physical location at the time they would like to communicate. Some individuals may rely upon telephonic, text, or other forms of communication that support limited forms of socializing. However, some forms of communication may not be sufficient to be able to give the individuals an experience similar to actually socializing in person. For instance, talking with someone over the phone or texting someone does not create a shared experience similar to sitting a room together watching a movie or playing a game.

Rather than socializing in the same physical location, techniques of this disclosure may, in various instances, provide a mechanism for two or more subscribers of a social network to socialize in the same virtual location (e.g., an online collaboration space). An online collaboration space may be a virtual space where multiple subscribers can engage in a conversation and/or share information. For example, the individuals participating in the online collaboration space may share and watch videos, play games, participate in video, audio, or text chat, surf the web, or any combination thereof. In other words, techniques of this disclosure may enable the creation of an online collaboration space that may mirror the experience of individuals hanging out in the same physical location.

In one example, a social network page may be associated with a first subscriber and may further include a link to an online collaboration space. The online collaboration space may further be associated with the first subscriber. A second subscriber may provide a user input to select the link in which case the second subscriber may join the online collaboration space. The first and second subscribers may then each participate in the online collaboration space, for example, by engaging in conversation, sharing media, playing games and the like.

Reference will now be made in detail to examples, which are illustrated in the accompanying drawings. In the following detailed description, numerous specific details are set forth. However, it will be apparent to one of ordinary skill in the art that the present invention, as defined by the claims, may be practiced without many of these specific details. In other instances, well-known methods, procedures, components, circuits, and networks have not been described in detail so as not to unnecessarily obscure aspects of the examples.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact. The first contact and the second contact are both contacts, but they are not the same contact.

The terminology used in the description herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

As used throughout this disclosure, headings are included to improve the clarity of the disclosure and are not used to define separate examples. In some examples, features of various examples may be combined and/or used from among multiple headings in accordance with aspects of the present disclosure.

Example System

FIG. 1 is a block diagram of a network architecture 100 of a social network in accordance with some examples. The network architecture 100 includes a number of client systems (also called "client devices," "client computers," or "clients") 104-1, 104-2 . . . 104-N communicably connected to a social network server system 108 by one or more networks 106.

In some examples, the client devices 104-1, 104-2 . . . 104-N can be computing devices such as laptop or desktop computers, smart phones, personal digital assistants, portable media players, tablet computers, televisions with one or more processors embedded therein or coupled thereto, or other appropriate computing devices that can be used to communicate with an electronic social network. In some examples, the social network server system 108 can be a single computing device such as a computer server, while in other examples, server system 108 is implemented by multiple computing devices working together to perform the actions of a server system (e.g., cloud computing). In some implementations, the network 106 can be a public communication network (e.g., the Internet, cellular data network, dialup modems over a telephone network) or a private communications network (e.g., private LAN, leased lines) or a combination of such communication networks.

Users 102-1 through 102-N of the client devices 104-1 through 104-N access the social network server system 108 to participate in a social networking service. For example, one or more of the client devices 104-1, 104-2 . . . 104-N execute web browser applications that can be used to access the social networking service. In another example, one or more of the client devices 104-1, 104-2 . . . 104-N execute software applications that are specific to the social network (e.g., social networking "apps" running on smart phones).

Users interacting with the client devices 104-1, 104-2 . . . 104-N can participate in the social networking service provided by the server system 108 by posting information, such as text comments (e.g., updates, announcements, replies), digital photos, videos, or other appropriate electronic information. Users of the social networking service can also annotate information posted by other users of the social networking service (e.g., endorsing or "liking" a posting, commenting on a posting). In some examples, information can be posted on a user's behalf by systems and/or services external to the social network or the server system 108. For example, the user may post a review of a movie to a movie review website, and with proper permissions that website may cross-post the review to the social network on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn.").

Users interacting with the client devices 104-1, 104-2 . . . 104-N can also use the social network provided by the server system 108 to define social circles, in order to organize and categorize the user's relationships to other users of the social network and to regulate which users in the social network will have access to information posted by the users. Examples of the creation and use of social circles are provided in U.S. Provisional patent application Ser. No. 13/164,562, entitled "Social Circles in Social Networks," filed Jun. 20, 2011, which is incorporated by reference herein in its entirety.

Users interacting with the client device 104-1 through 104-N can use the social network provided by the server system 108 to meet and collaborate in a virtual space (which can also be called an online collaboration space, online meeting space, or an online or social network hangout). Each user 102-1, 102-2 . . . 102-N of the social network service has an associated virtual space within the social network service implemented by the social network server system 108. In some examples, users are given the option of opting out of having a virtual space within the social network service, and in such examples less than all users 102 may have an associated virtual space. A user 102 may enter another user's virtual space to "meet" with the user who "owns" the virtual space and other users who have entered the virtual space. While in the virtual space, the users in the virtual space can communicate with each other and share content amongst themselves. Details of examples of virtual spaces in a social network service are further described below.

In some examples, the network architecture 100 also includes a shared content server system 110, such as a document server system. In some examples, while meeting in a virtual space in the social network service, one or more users in the virtual space are directed to a user interface for accessing the shared content server system 110. Through the user interface for the shared content server system 110, the users may share content, such as documents, images, and videos, with each other.

As with the social network server system 108, in some examples, the shared content server system 110 can be a single computing device such as a computer server, while in other examples the shared content server system 110 is implemented using multiple computing devices working together to perform the actions of a server system (e.g., cloud computing).

Example Client Device

Figure 2:
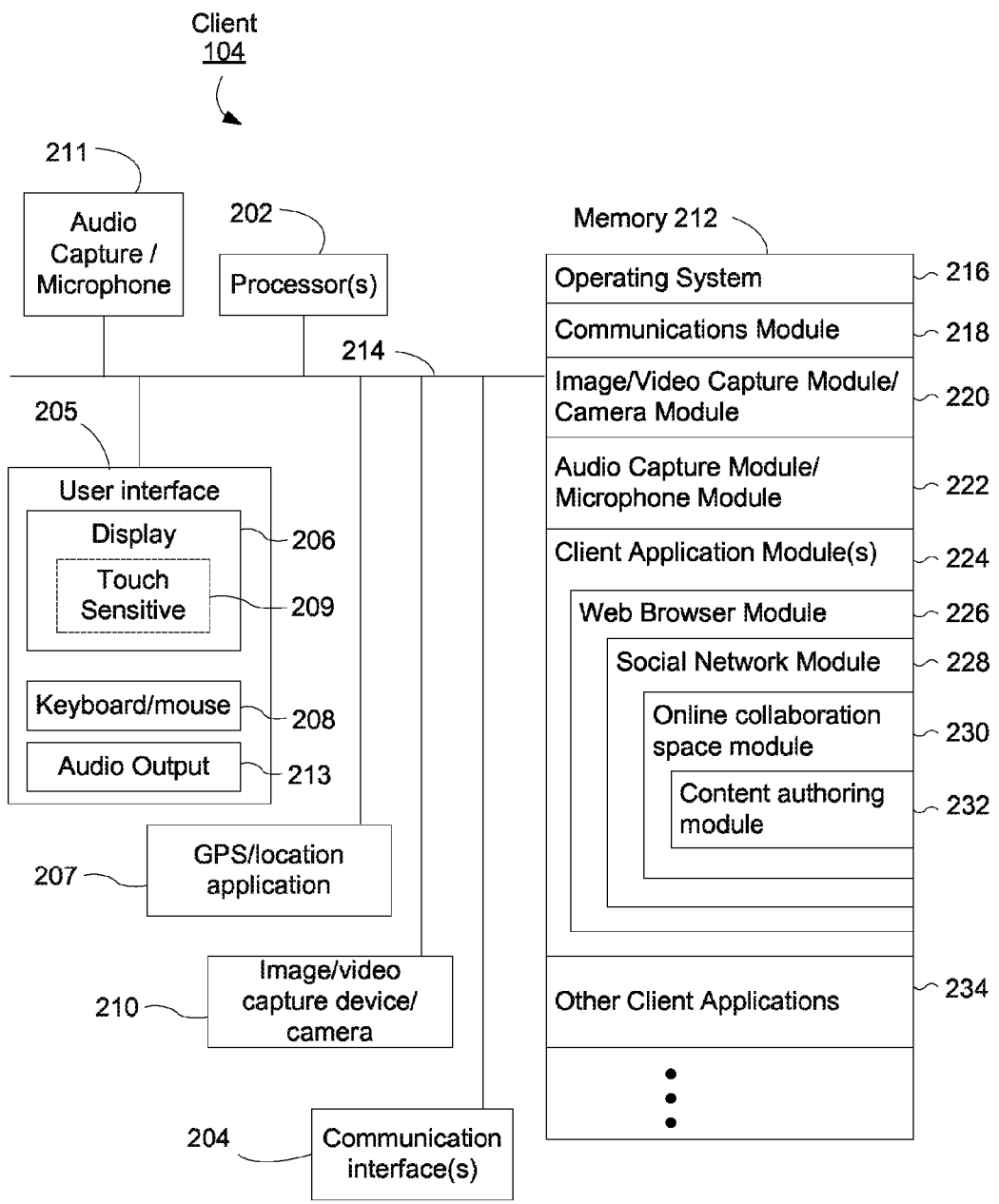
FIG. 2 is a block diagram illustrating a client system in accordance with some examples.

FIG. 2 is a block diagram illustrating a client system 104 in accordance with some examples. Client system 104 typically includes one or more processing units (processors) 202, one or more network or other communications interfaces 204, memory 212, and one or more communication buses 214 for interconnecting these components. The communication buses 214 optionally include circuitry (sometimes called a chipset) that interconnects and controls communications between system components. Client system 104 includes a user interface 205. The user interface 205 typically includes a display device 206 and optionally includes an input means such as a keyboard, mouse, or other input buttons 208. Alternatively or in addition the display device 206 includes a touch sensitive surface 209, in which case the display 206/209 is a touch sensitive display. In client systems that have a touch sensitive display 206/209, a physical keyboard is optional (e.g., a soft keyboard may be displayed when keyboard entry is needed). The user interface also includes an audio output device 213, such as speakers or an audio output connection connected to speakers, earphones, or headphones. Furthermore, some client systems use a microphone and voice recognition to supplement or replace the keyboard. Optionally, the client 104 includes an audio capture device 211 (e.g., a microphone) to capture audio (e.g., speech from a user). Optionally, the client 104 includes a GPS (global positioning satellite) receiver, or other location detection apparatus 207 for determining the location of client system 104. Client system 104 also optionally includes an image/video capture device 210 such as a camera or webcam.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the processor(s) 202. Memory 212, or alternately the non-volatile memory device(s) within memory 212, comprises a non-transitory computer readable storage medium. In some examples, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting client system 104 to other computers via the one or more communication network interfaces 204 (wired or wireless) and one or more communication networks, such as the Internet, other wide area networks, local area networks, metropolitan area networks, and so on;
- a image/video capture module or camera module 220 for processing a respective image or video captured by the image/video capture device/camera 210, where the respective image or video may be sent or streamed (e.g., by a client application module) to the social network server system;
- an audio capture module or microphone module 222 for processing audio captured by the audio capture device/microphone 211, where the respective audio may be sent or streamed (e.g., by a client application module) to the social network server system;
- one or more client application modules 222, including a web browser module 226 for executing and rendering a social network module 228 which provides an interface to a social network (e.g., a social network provided by social network server system 108) and related features;
- an online collaboration space module 230, within the social network module 228, for providing an interface to an online collaboration space in the social network, and a content authoring module 232 for creating and editing content within the online collaboration space; and
- additional optional client applications 232 such as a digital media playback and organization application.

Example Server Device

Figure 3:
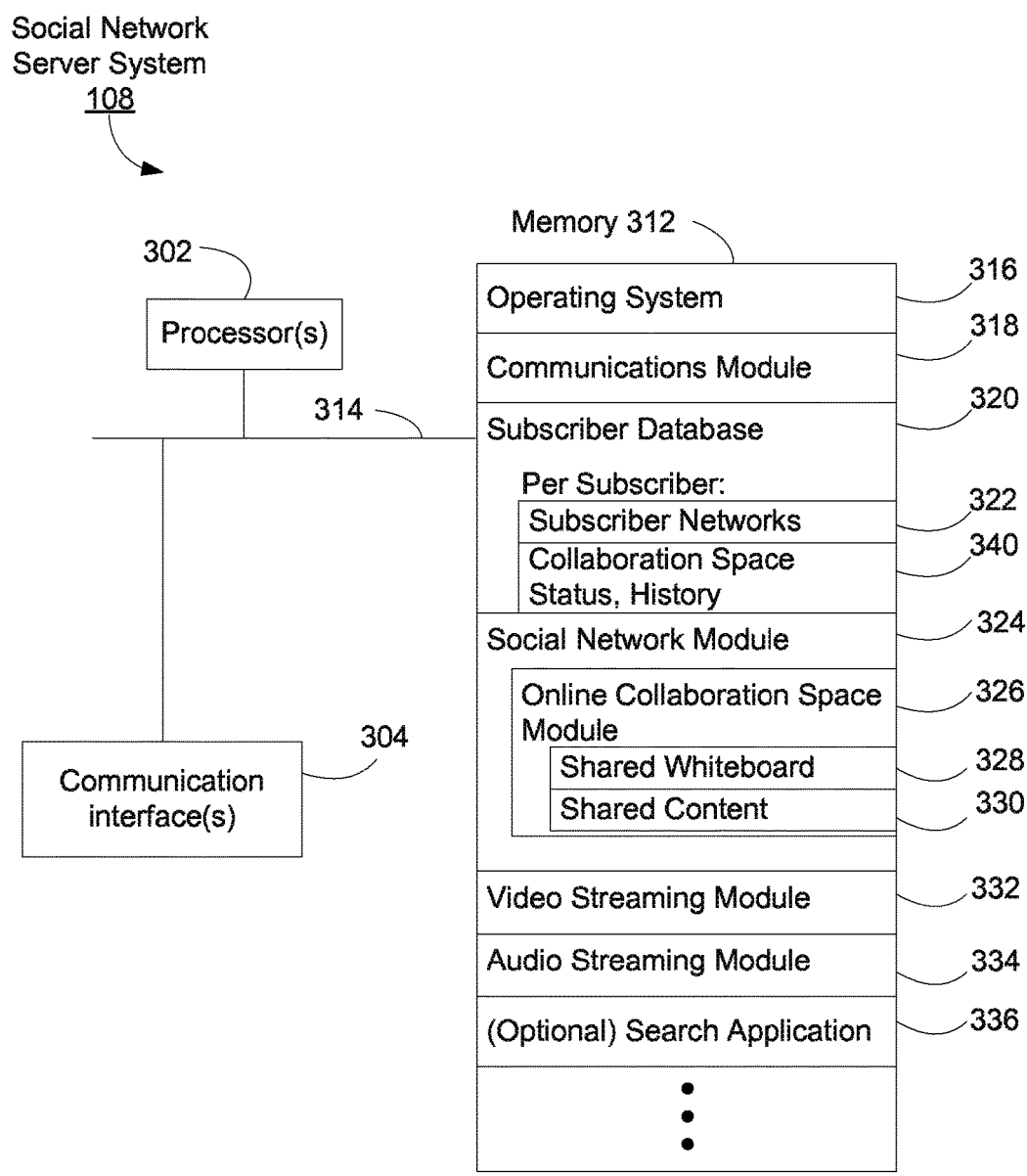
FIG. 3 is a block diagram illustrating a social network server system in accordance with some examples.

FIG. 3 is a block diagram illustrating a social network server system 108 in accordance with some examples. The social network server system 108 typically includes one or more processing units (processor's) 302, one or more network or other communications interfaces 304, memory 312, and one or more communication buses 314 for interconnecting these components. The communication buses 314 optionally include circuitry (sometimes called a chipset) that interconnects and controls communications between system components. The social network server system 108 optionally includes a user interface (not shown). The user interface, if provided, may include a display device and optionally includes an input means such as a keyboard, mouse, or other input buttons. Alternatively or in addition the display device includes a touch sensitive surface, in which case the display is a touch sensitive display.

Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the processor(s) 302. Memory 312, or alternately the non-volatile memory device(s) within memory 312, comprises a non-transitory computer readable storage medium. In some examples, memory 312 or the computer readable storage medium of memory 312 stores the following programs, modules and data structures, or a subset thereof:

- an operating system 316 that includes procedures for handling various basic system services and for performing hardware dependent tasks;
- a network communication module 318 that is used for connecting the social network server system 108 to other computers via the one or more communication network interfaces 304 (wired or wireless) and one or more communication networks, such as the Internet, other wide area networks, local area networks, metropolitan area networks, and so on;
- a subscriber database 320 for storing data associated with subscribers/members of the social network, including login information, privacy and other preferences, biographical data, and so forth;
- subscriber network information 322 in subscriber database 320 for storing data regarding groups and circles of subscribers in the social network;
- collaboration space status and history 340, retained for each subscriber (or for each subscriber for whom there is a collaboration space that has been used at least once); the collaboration space status includes information indicating the current participants, information indicating participant preferences and configuration selections (e.g., muting and volume selections made by participants, other than default settings), and information indicating content currently being viewed within the collaboration space; the collaboration space history includes chat history information, information indicating content previously presented in the collaboration space (which, in some examples, remains available for review by participants in the collaboration space), and optionally additional log information representing events that have occurred in the collaboration space;
- a social network module 324 for providing social network services and related features, in conjunction with social network module 228 on client system 104;
- an online collaboration space module 326 in social network module 326 for providing online collaboration spaces in the social network, and providing access to the online collaboration spaces, in conjunction with online collaboration space module 230 on client system 104;
- shared whiteboard module 328 for providing, in a respective online collaboration space, an interface where content posted by users is displayed to users in the online collaboration space for collective reviewing and editing;
- shared content 330 that has been posted by users in one or more of the online collaboration spaces, to be shared with other users of those online collaboration spaces;
- video streaming module 332 for streaming video received from client systems 104, and optionally other video content as well, to users in the online collaboration space;
- audio streaming module 334 for streaming audio received from client systems 104, and optionally other audio content as well, to users in the online collaboration space; and
- optionally, a search application 336, for enabling users to search for content in the social network.

Example Social Network Page

Figure 4A:
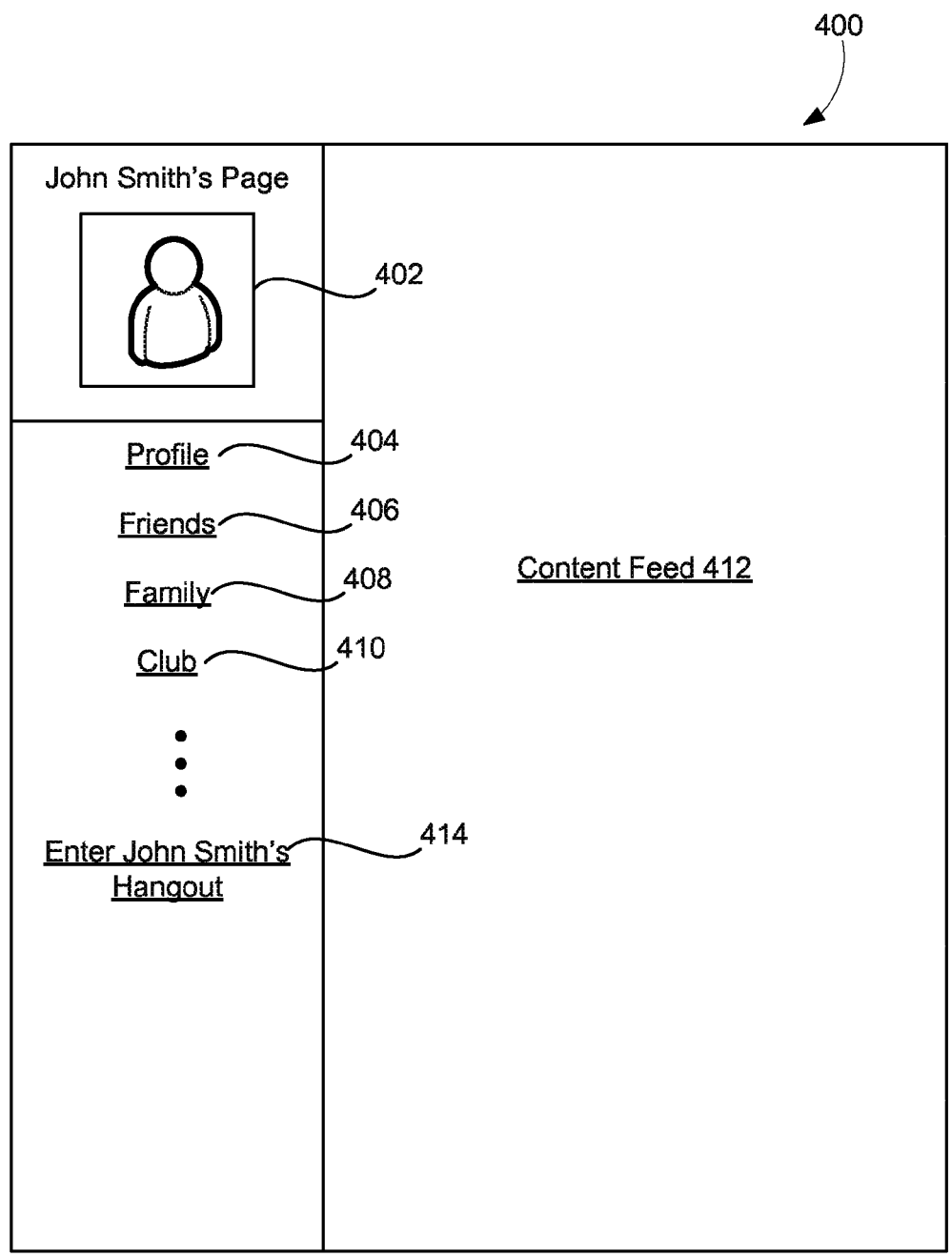
FIGS. 4A-4B illustrate an exemplary social network page associated with a subscriber of the social network, in accordance with some examples.

FIG. 4 illustrates an exemplary social network page 400 in accordance with some examples. The social network page 400 is associated with a subscriber/member (e.g., "John Smith") of a social network provided by social network server system 108. Generally, a social network page as used herein is a broad term encompassing as its plain and ordinary meaning, including but not limited to a graphical representation of content or links to content associated with a subscriber. The social network page 400 includes content or links to content associated with the subscriber, such as a photo 402 of the subscriber, a link 404 to a profile of the subscriber, and one or more links 406, 408, 410 to information on circles of subscribers to which the subscriber belongs or categories or groups of contacts in the subscriber's network. In some examples, the social network page 400 also includes a link to a roster of contacts (who may or may not be subscribers to the social network) within the subscriber's network of contacts.

The social network page 400 also includes a content feed or stream 412. The content feed 412 includes updates, posts, and other content posted by the subscriber. In some examples, the content feed 412 also includes updates, posts, and other content posted by other contacts in the subscriber's circles and network and/or by a third party service to which the subscriber has given permission to post content to the content feed 412.

The social network page 400 further includes a link 414 to an online collaboration space (hereinafter referred to as a "hangout") associated with the subscriber. Generally, an online collaboration space as used herein is a broad term encompassing as its plain and ordinary meaning, including but not limited to a virtual space where multiple subscribers can engage in a conversation and/or share information. In some examples, the virtual space may be implemented using one or more objects, which may be stored in and/or are executable by software or hardware. In some examples, each subscriber in the social network has his own hangout; a subscriber may be said to "own" the hangout associated with him. A subscriber in the social network can enter his own hangout or a hangout associated with a subscriber in his network of subscribers within the social network; a subscriber can self-invite himself into the hangout of a subscriber in his network of subscribers within the social network.

Figure 4B:
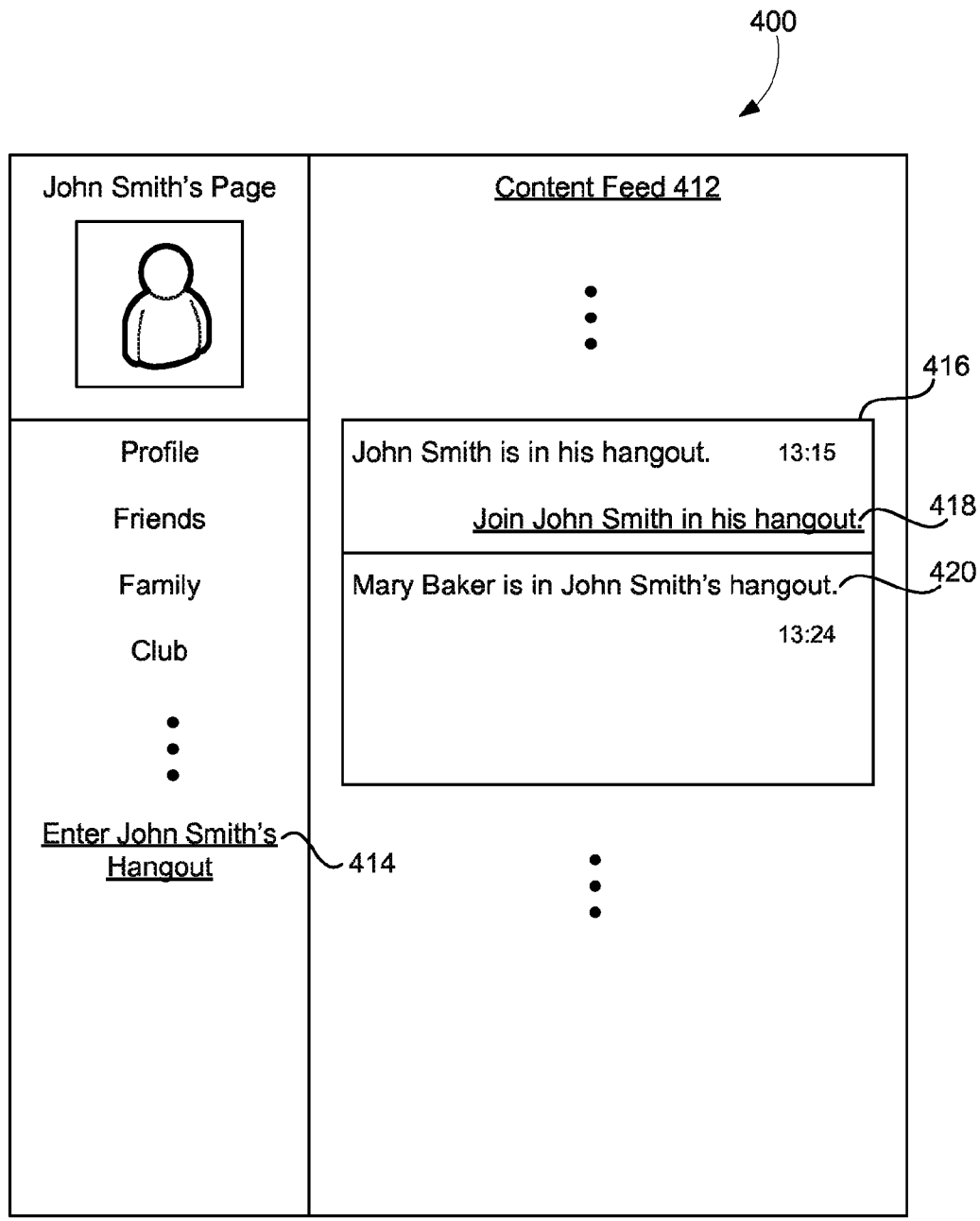

In some examples, a subscriber's status regarding entry or exit from a hangout is posted in a content feed. For example, FIG. 4B illustrates an exemplary hangout status posting in a content feed, according to some examples. The content feed 412 includes a posting 416 announcing that the subscriber "John Smith" entered into his own hangout. The posting 416 also includes a link 418, similar to link 414, to enter John Smith's hangout.

When another subscriber has entered into John Smith's hangout, such status is optionally posted in content feed 412. For example, posting 420 shows that another subscriber, "Mary Baker," has entered John Smith's hangout. Postings 416 and 420 inform subscribers viewing content feed 412 the status of John Smith's hangout with respect to the presence, or lack of, subscribers as participants in the hangout.

Example Hangout

FIGS. 5A-5L illustrate an exemplary user interface for a hangout, from the perspective of a participant in the hangout (referred to below as the "participant user"), in accordance with some examples. For ease of understanding, the hangout participants other than the participant user will be referred to below and in FIGS. 5A-5L as "John Smith" (or "John") and "Mary Baker" (or "Mary").

The elements of the hangout user interface 500 are generated by social network server system 108, based at least in part on audio streams, video streams and user commands received from the client systems 104 of the participants; the resulting hangout user interface is transmitted to the client systems 104 of the hangout participants. In some examples, some portions of the hangout user interface (e.g., private chat panel 508) are different for different participants, while other portions of the hangout user interface (e.g., content panel 501) are the same for all participants in the hangout.

A hangout user interface 500 is displayed at a client system 104 in response to the participant user clicking on a link (e.g., link 414) to self-invite himself into the hangout associated with the link. In some examples, entry by the participant user into a hangout that is not the participant users' is subject to the hangout owner's approval, either through permission settings (where, for example, the participant user is set to always have permission to enter the hangout) or case-by-case approval. In some examples, entry into a social network subscriber's hangout is limited to other social network subscribers that are within the hangout owner's network of subscribers in the social network (e.g., subscribers in the hangout owner's circles). In other examples, social network subscribers that are within a user's network of subscribers in the social network (e.g., subscribers in the hangout owner's circles) automatically have permission to enter the user's hangout, and entry by all other subscribers is on case-by-case approval, unless the user has specially revoked the permission of a particular subscriber or set of subscribers, or has otherwise set explicit hangout entry permissions (e.g., given permission to enter the hangout only to specified users and/or circles of contracts).

The hangout user interface 500-A includes content panel 501 and thumbnails 502 of video streams (e.g., live or real-time webcam feeds, video clips, screencasts, etc.) streaming from client systems 104 corresponding to participants in the hangout, including thumbnail 502-1 corresponding to John and thumbnail 502-2 corresponding to Mary. More generally, thumbnails 502 represent respective participants in the hangout, regardless of whether a video stream from a participant is active; a participant can participate in the hangout with audio, without a webcam, or even by only textual communication (e.g., chatting by textual messages). In some examples, the thumbnails 502 include a thumbnail 502-3 of the video stream of the participant user; the participant user can see himself in the thumbnail 502-3. Hangout user interface 500 also includes a control panel 504, a group chat panel 506, a private chat panel 508, and a status bar 510. In some examples, the hangout user interface also includes a chat button 512, a mute button 514, and a block camera button 516. In some examples, the hangout user interface 500 includes more or fewer user interface elements (e.g., buttons, pull-down menus, panels, affordances, etc.) than shown in FIG. 5A.

In some examples, when there is a video stream (e.g., webcam video stream) from the client system of a participant, the corresponding video stream thumbnail 502 is a reduced size version of the actual video stream, with the size scaled down so that more than one thumbnail can be displayed concurrently in the hangout user interface 500. Optionally, when there is not a video stream from the client system of a participant (e.g., because the participant has turned off or blocked the video stream, or because the participant's client system does not have a webcam), a static image of the participant, or a static icon associated with the participant, is displayed.

A video stream 518 from one of the participants may be selected by the participant user for display in the content panel 501. In some examples, the thumbnail 502 corresponding to the video stream 518 being displayed in the content panel 501 is highlighted. For example, thumbnail 502-1 is highlighted with thicker borders; the video stream 518 shown in FIG. 5A corresponds to John. In another example, a border of the thumbnail 502 corresponding to the user-selected video stream is displayed in a different color than the other thumbnails. The participant user may select any one of the thumbnails 502 (e.g., by clicking on the desired thumbnail 502) to have the video stream corresponding to the selected thumbnail 502 displayed in the content panel 501. For example, the participant user can select thumbnail 502-2 to switch the video stream 518 displayed in the content panel 501 to the video stream corresponding to Mary. Regardless of which video stream is displayed in the content panel 501, an active audio stream by any of the participants (e.g., when a participant is speaking into his respective audio capture device/microphone 211) is output by client system 104 (e.g., through audio output 213). For example, the participant user can hear Mary talking even if the video stream corresponding to Mary is not displayed in the content panel 501. In some examples, an audio stream is active when the audio stream is streaming audio other than ambient sound. For example, an audio stream is active when the input audio into the stream includes speech (e.g., a participant speaking into his respective audio capture device/microphone 211), music (e.g., music playing and streaming from the participant's client system 104), or sounds whose amplitude is above a predefined threshold. In some examples, an "active" audio stream means an activity metric for the audio stream is above a threshold level, indicating the participant is speaking or otherwise contributing audio information to the hangout.

In some examples, visual indicia of a participant talking (or more generally, an active audio stream from the participant's client system) are displayed. For example, icon 520-1 displayed over a thumbnail 502-1 indicates that John, corresponding to thumbnail 502-1, is talking, or more generally, the audio stream from John's client system 104 is active. Optionally, a status message indicating a participant talking (e.g., "John Smith is talking") is displayed in status bar 510. These visual indicia are generated by social network server system 108 and transmitted to the client systems 104 of the hangout participants as part of the hangout user interface 500-A.

The hangout user interface 500-A includes a group chat panel 506 and a private chat panel 508. The participant user can use the group chat panel 506 to engage in a group chat with one or more of the other participants in the hangout. The past and present contents of the group chat are visible to any participant in the particular hangout. For example, the participant user, John, Mary, and participants who come into the hangout later can review the group chat contents, including past group chats. The participant user can use the private chat panel 508 to engage in individual private chats with respective participants in the hangout. The contents of a private chat are visible to the specific participants in the private chat but not to other participants in the hangout. For example, in FIG. 5A, the participant user and Mary are chatting privately; only the participant user and Mary can see the contents of their private chat. The participant user can have multiple private chats active at a time; the participant user can have a private chat with Mary and a separate private chat with John. In some examples, any participant in a private chat can prevent private chats in which they participate from being recorded by selecting a displayed "do-not-record private chats" affordance (not shown), in which case the content of those private chats become inaccessible once they scroll off screen; alternatively the content of a private chat becomes inaccessible once the private chat is concluded.

Control panel 504 includes links 522 that, when selected by the participant user, activate respective functions. For example, link 522-1, when selected, activates a participant invitation function; the participant user may invite other subscribers of the social network to participate in the hangout. Further details regarding the functions activated by links 522 are described below.

In some examples, the hangout user interface 500-A includes chat button 512, mute button 514, and block camera button 516; each of these buttons is an affordance for activating a particular function. The participant user can select the chat button 512 to initiate a chat (group chat using the group chat panel 506 or private chat using the private chat panel 508) with one or more participants. The participant user can also select mute button 514 to mute himself, i.e., from the perspective of John and Mary, the participant user's audio stream is muted. The participant user can select block camera button 516 to disable his video stream (e.g., the participant user's webcam feed) from the other participants in the hangout; from the perspective of John and Mary, the participant user's video stream is disabled. In some examples, block camera button 516 disables specifically the participant user's live webcam feed. John and Mary won't be able to see the participant user himself through the participant user's webcam feed, but can still see other video content streamed by or from the participant user (e.g., screencast, a video clip, etc.).

Figure 5A:
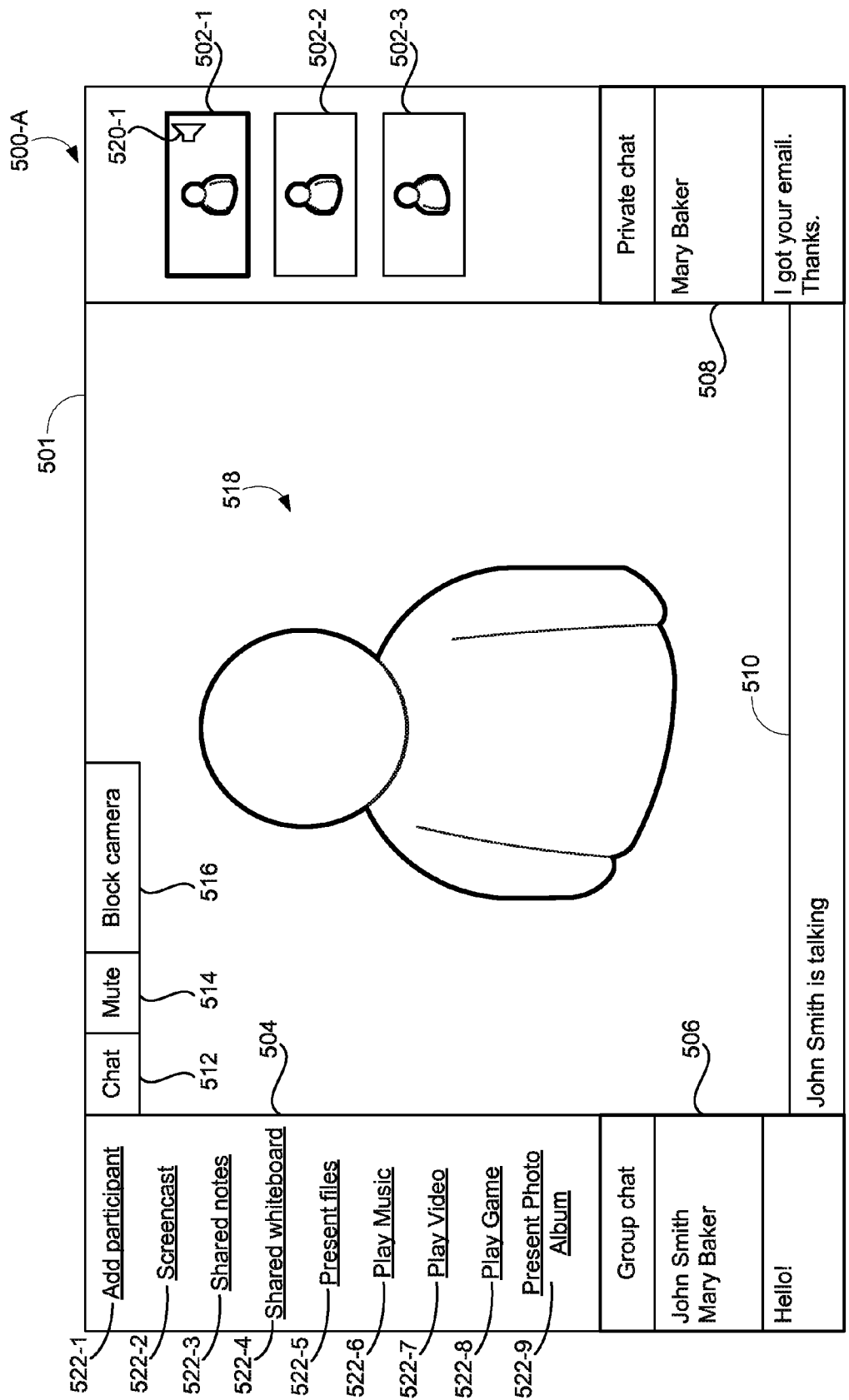
FIGS. 5A-5L illustrate an exemplary user interface for a hangout, from the perspective of a participant, in accordance with some examples.
Figure 5B:
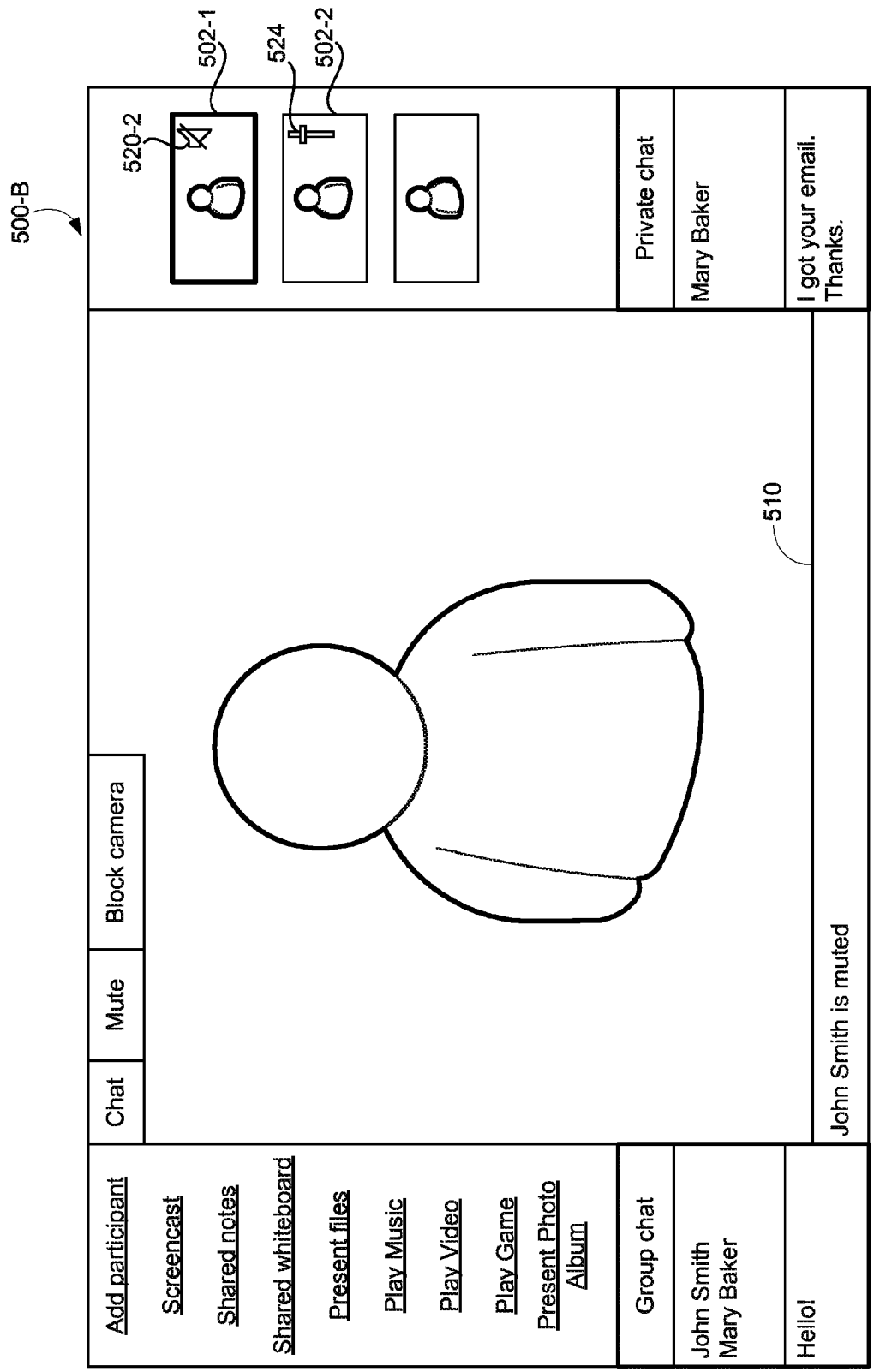

In some examples, the participant user can mute the audio stream of another participant (e.g., John) by selecting icon 520-1. FIG. 5B illustrates hangout user interface 500-B, with icon 520-1 changed, after selection of icon 520-1, to icon 520-2 to indicate that the audio stream corresponding to John is muted. Optionally, when an audio stream is muted, a status message to that effect (e.g., "John Smith is muted") is displayed in status bar 510.

In some examples, an individual volume control 524 is displayed over a video stream thumbnail (e.g., thumbnail 502-2 in FIG. 5B). The volume control 524 can be, for example, a slider control. The participant user can select the volume control 524 to adjust the volume of the audio stream associated with the thumbnail 502-2. For example, the participant user can adjust the volume of Mary's audio stream using volume control 524.

In some examples, the social network server system 108 sends different audio content to different participants in the same hangout, as needed, so as to avoid sending back to users the same audio content that they are contributing (if any) to the hangout. In addition, since the participants each have volume controls and muting controls for audio contributions by other participants, the social network server system 108 sends an audio stream to each participant in accordance with the current state of the volume and muting controls set by that participant.

Figure 5C:
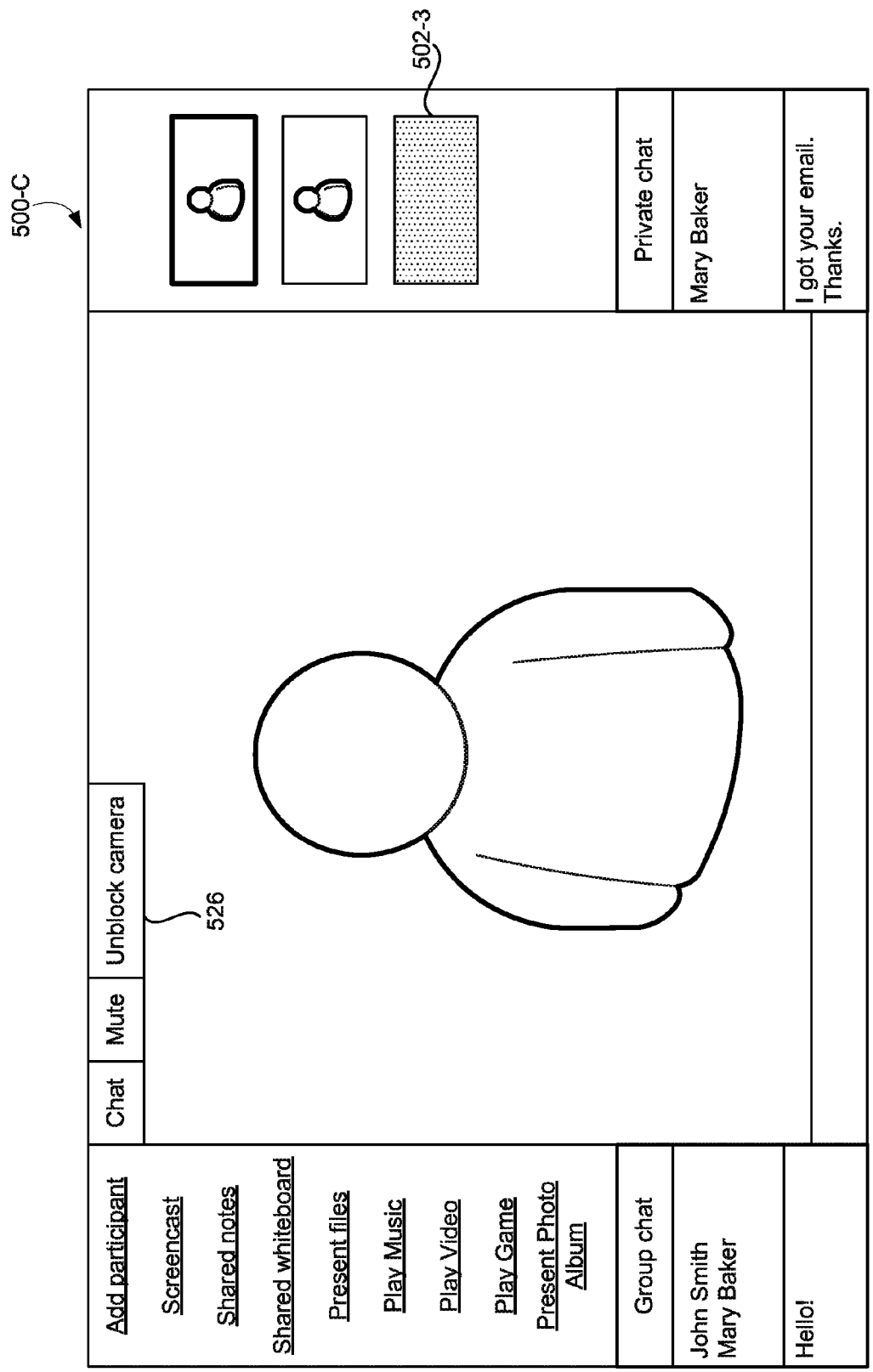

As described above, the participant user may select block camera button 516 to disable his video stream, or in some examples, specifically his webcam feed. FIG. 5C illustrates hangout user interface 500-C with the participant user's video stream disabled in response to selection of block camera button 516 by the participant user. Thumbnail 502-3, corresponding to the participant user, is blacked out, indicating that the video stream is disabled and not visible to John or Mary. Block camera button 516 has also been replaced by unblock camera button 526. The participant user can select the unblock camera button 526 to re-enable the video stream.

Figure 5D:
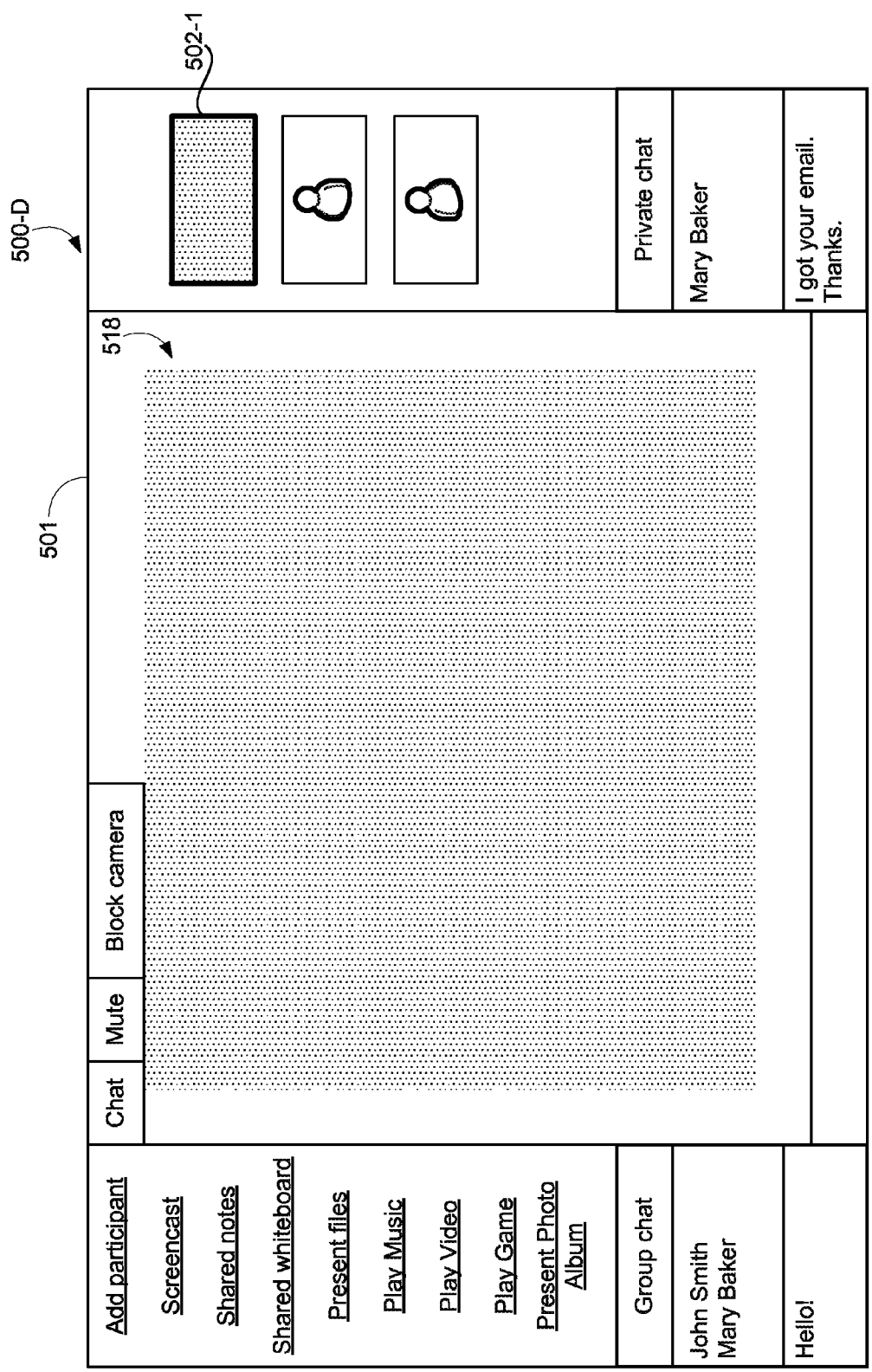

FIG. 5D illustrates a hangout user interface 500-D, where John has disabled his video stream. From the perspective of the participant user, the video stream 518 corresponding to John, displayed in content panel 501, is blacked out, as shown in FIG. 5D.

Figure 5E:
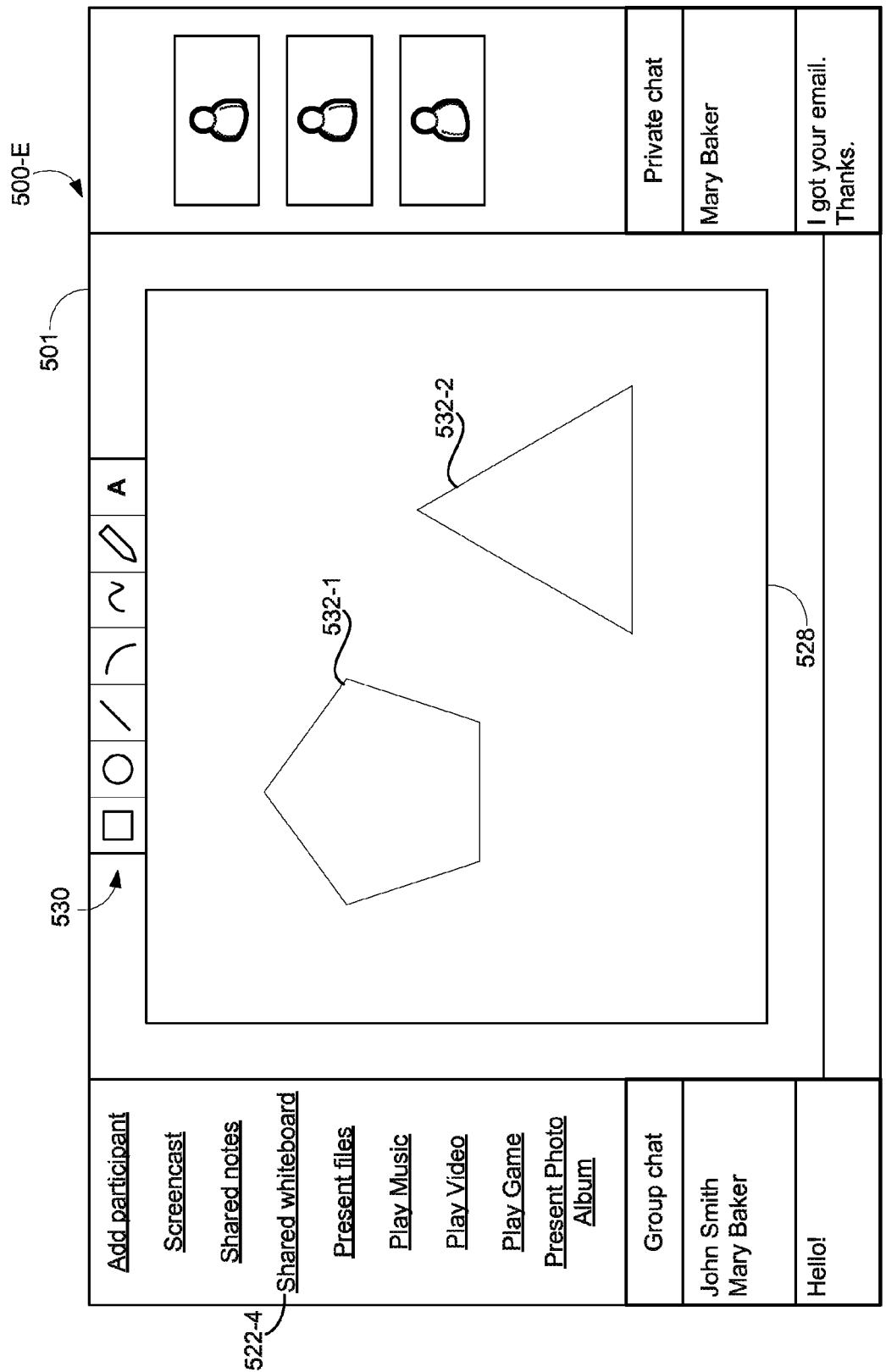

FIG. 5E illustrates a hangout user interface 500-E, which includes a whiteboard area 528 displayed in the content panel 501. The whiteboard area 528 is displayed in response to selection of the shared whiteboard link 522-4 by the participant user. The whiteboard area 528 is a shared content area whose content is viewable and modifiable by any participant in the hangout. In some examples, the whiteboard area 528 is a drawing area; buttons 530 corresponding to drawing tools are displayed along with the whiteboard area 528. In some examples, buttons 530 include buttons corresponding to a rectangle drawing tool, a circle/ellipse drawing tool, a straight line drawing tool, an arc drawing tool, a curve drawing tool, a freeform drawing tool, and a text box tool. Using the tools corresponding to buttons 530, participants in the hangout can draw graphical objects and add text onto the whiteboard area 528, such as objects 532-1 and 532-2. In some examples, whatever contents that are added to the whiteboard area 528 are saved so that participants in the hangout can review and modify the contents at a later time.

Figure 5F:
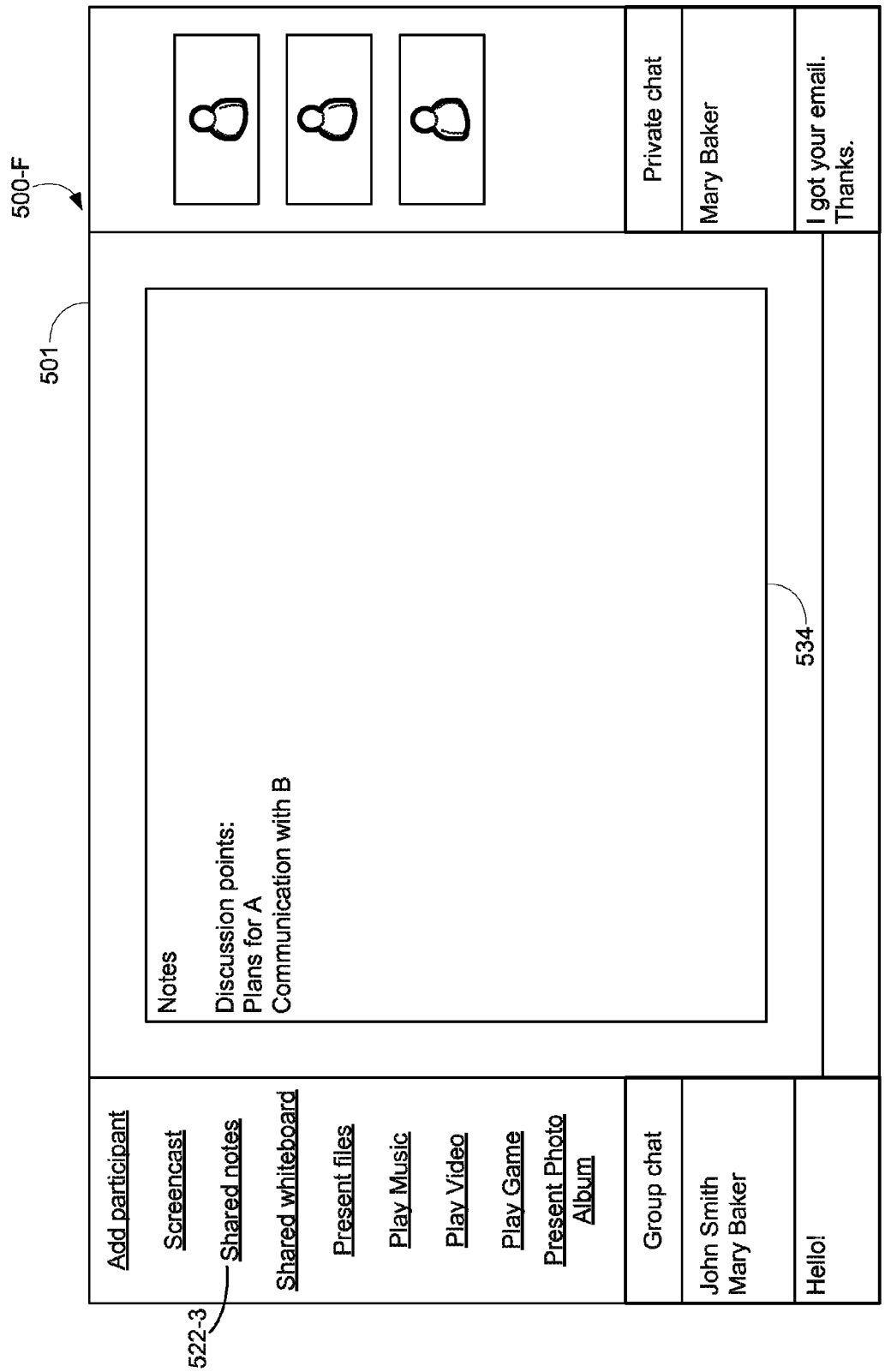

FIG. 5F illustrates a hangout user interface 500-F, which includes a notes area 534 displayed in the content panel 501. The notes area 534 is displayed in response to selection of the shared notes link 522-3 by the participant user. The notes area 534 is a shared content area whose content is viewable and modifiable by any participant in the hangout. In some examples, the notes area 534 is a text processing area where participants in the hangout can enter and modify text. Content added to the notes area 534 by any participant is automatically saved (e.g., by the social network server system 108 or the shared content server system 110) that participants (including current and future participants) in the hangout can review and modify the contents at a later time.

Figure 5G:
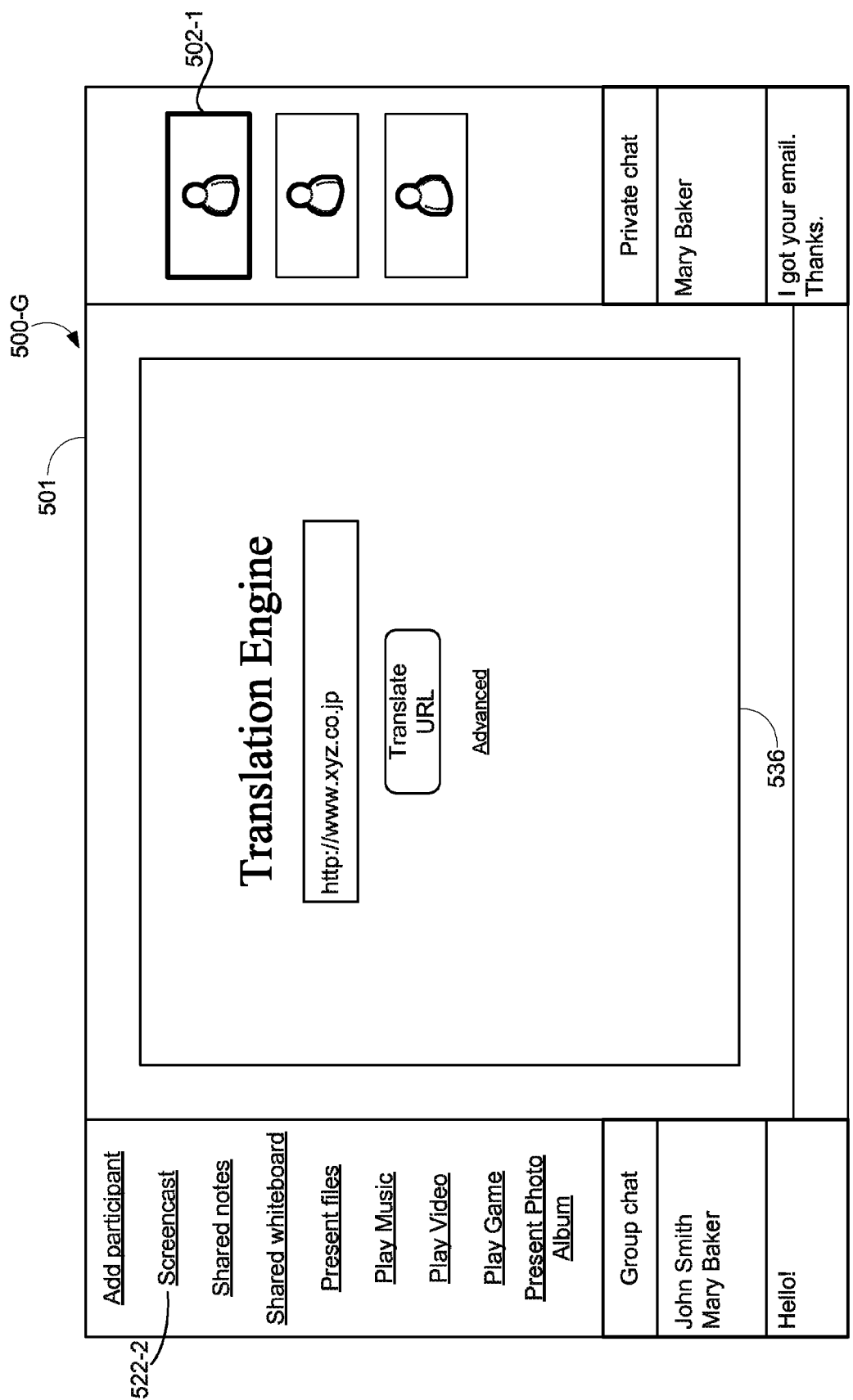

FIG. 5G illustrates a hangout user interface 500-G, which includes a screencast 536 displayed in the content panel 501. The screencast 536 is a video capture of the content (e.g., the content of an application window) displayed on client system 104 corresponding to one of the hangout participants other than the participant user. For example, thumbnail 502-1 is highlighted to indicate that the screencast 536 in FIG. 5G is streaming from client system 104 corresponding to John. The screencast 536 shows the contents displayed on John's client system 104 as John manipulates the displayed contents. In some examples, the thumbnail 502-1 corresponding to client system 104 from which the screencast 536 is streamed shows the webcam feed corresponding John. In some other examples, the thumbnail 502-1 corresponding to client system 104 from which the screencast 536 is streamed shows the screencast 536 in thumbnail form.

In some examples, if the participant user wishes to show to John and Mary a screencast of the contents displayed on client system 104 corresponding to the participant user, the user selects screencast link 522-2 to activate the screencast function.

Figure 5H:
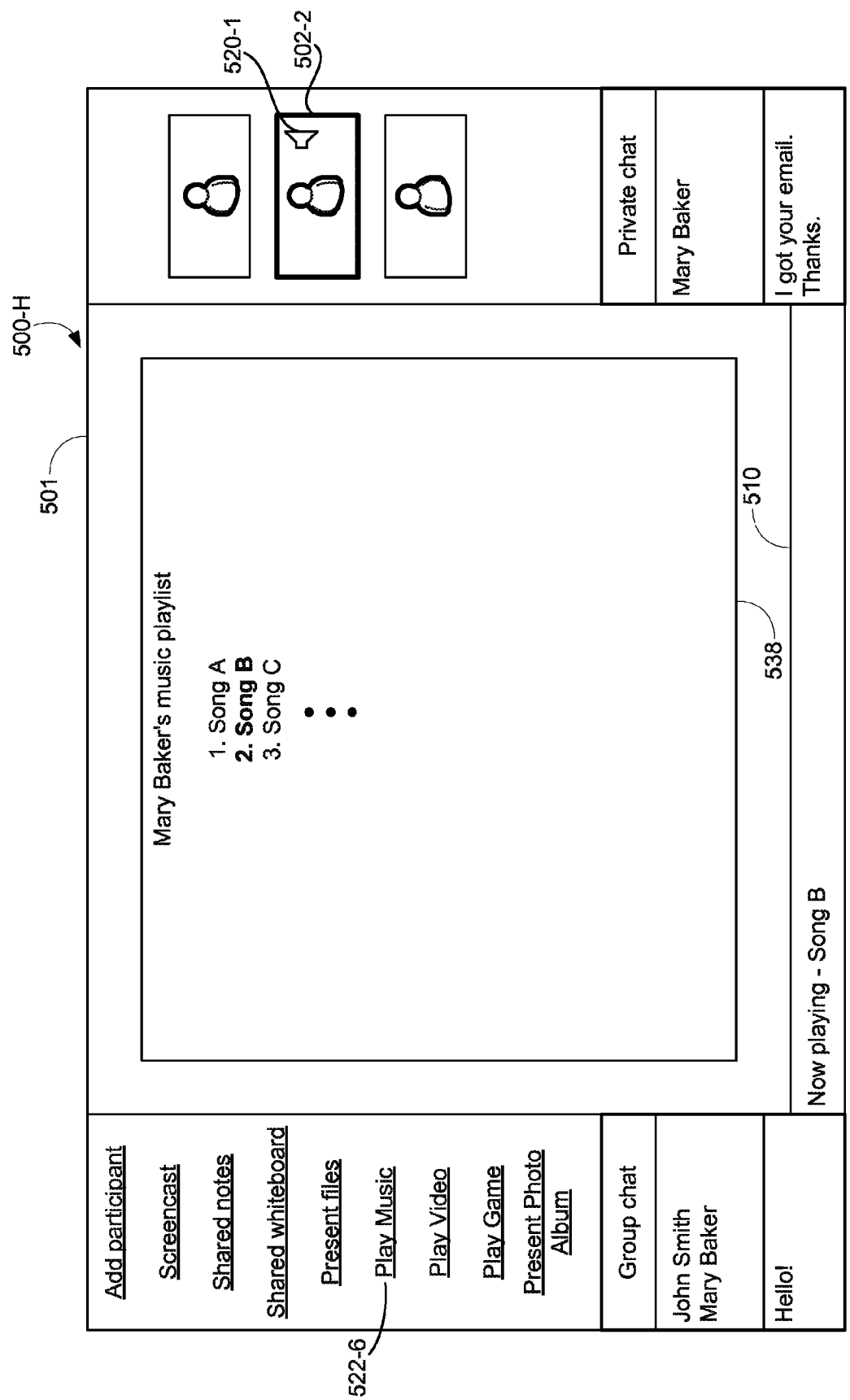

FIG. 5H illustrates a hangout user interface 500-H, which includes a digital content (e.g., music) playlist 538 displayed in the content panel 501, while a digital content item in the playlist 538 is being played back to the participants in the hangout. In some examples, playlist 538 is a list of digital content items stored at a client system 104 of one of the hangout participants, and one or more of the digital content items are played back at client system 104 of the participant and streamed to the other participants through the hangout (e.g., in an audio stream transmitted by the social network server system). For example, in FIG. 5H, the digital content is associated with Mary and is being played back at Mary's client system 104 and streamed to the participant user and John (i.e., to the other participants in the hangout). In some examples, the digital content playlist 538 is associated with a client application 234 (e.g., a music playback and organization application) stored at Mary's client system 104. Icon 520-1 is displayed over thumbnail 502-2, indicating that the audio stream corresponding to Mary is active (in this case, streaming the music being played at Mary's client system 104). In some examples, a status message indicating the content being played (e.g., "Now playing—Song B") is displayed in the status bar 510.

Any participant in the hangout can, at his/her client system 104, play back digital content (e.g., music) and stream the played music to other participants in the hangout by selecting play music link 522-6.

In some examples, digital content (e.g., music) is played back and streamed to the hangout participants while the hangout participants are viewing other content in the hangout, such as the whiteboard area 528, the notes area 534, or screencast 536.

Figure 5I:
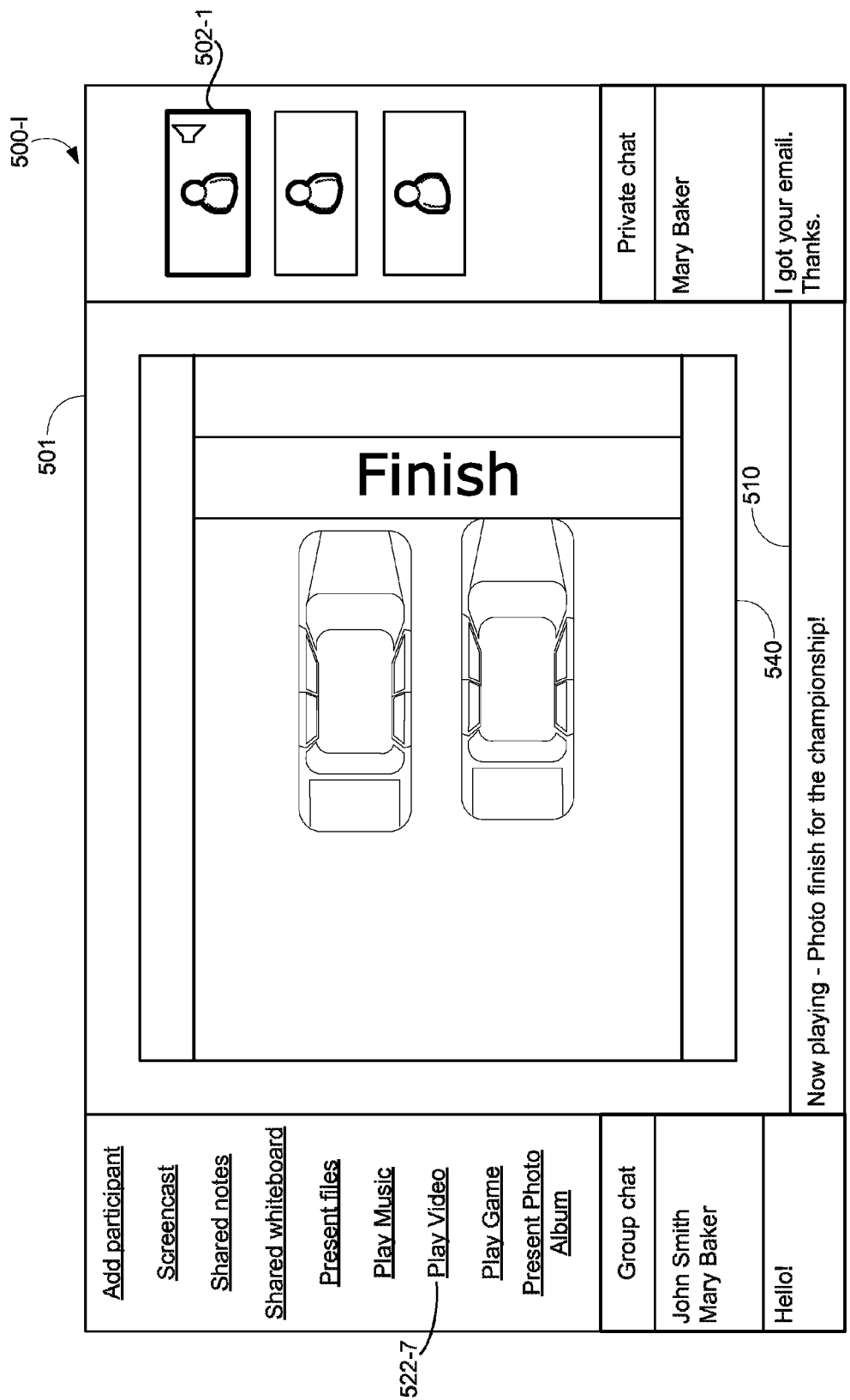

FIG. 5I illustrates a hangout user interface 500-I, which includes a video clip 540 being displayed in the content panel 501. In some examples, the video clip 540 is being streamed from client system 104 of a hangout participant other than the participant user. In FIG. 5I, thumbnail 502-1 is highlighted to indicate that the video clip 540 is being streamed from John's client system 104. In some other examples, the sharing participant (e.g., John), provides a link to an online video clip, and the link is sent to the client systems of the other participants, where the video clip is accessed and played back using the link. In some examples, a status message indicating the video being played (e.g., "Now playing—Photo finish for the championship!") is displayed in the status bar 510. In some examples, the video clip, when displayed in the content panel 501, is displayed in place of the video stream of the participant sharing the video clip. Optionally, while the participant user cannot see the sharing participant's webcam feed in content panel 501, he/she but can still see the sharing participant's webcam feed in the corresponding thumbnail 502.

In some examples, any participant in the hangout can play a video clip and stream it to the other hangout participants by selecting the play video link 522-7. In some examples, when the participant selects the play video link 522-7, the participant is prompted to provide a video clip stored at the participant's client system 104 or a link to an online video clip for playback. The provided video clip is played in the hangout user interface 500 at the participant's client system 104 and streamed to the other hangout participants.

Figure 5J:
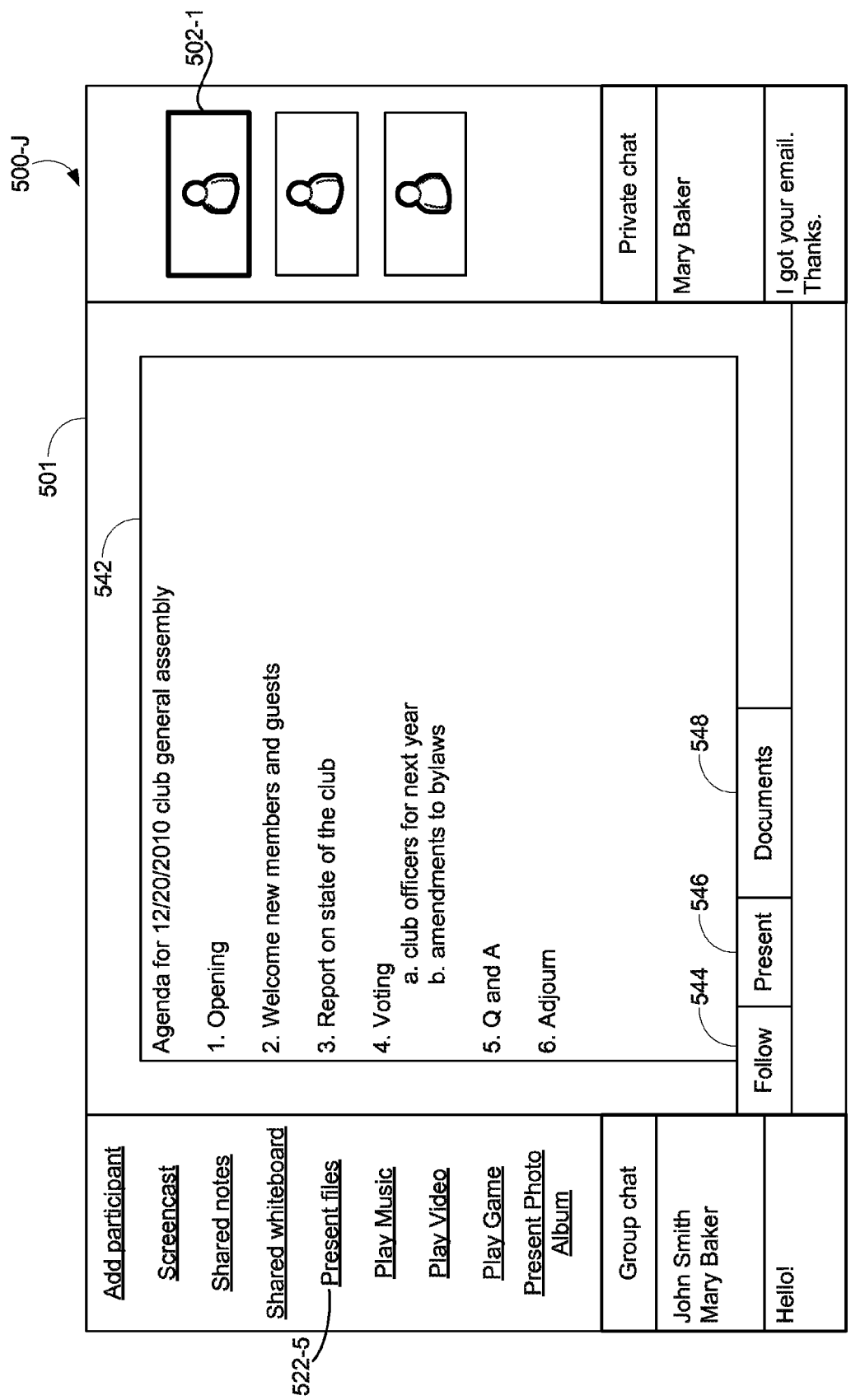

FIG. 5J illustrates a hangout user interface 500-J, which includes a document 542 being displayed in the content panel 501. In some examples, the document 542 is a document file (e.g., a MICROSOFT WORD document, a MICROSOFT EXCEL spreadsheet, a MICROSOFT POWERPOINT presentation, a Portable Document Format (PDF) document, a plain text file, etc.) stored at the client device of one of the hangout participants. In FIG. 5J, the document 542 comes from client system 104 corresponding to John, as indicated by highlighted thumbnail 502-1; John is the document owner and selected the document for presentation to the hangout participants. In some examples, the document 542 is a document (stored in a document file) retrieved from shared content server system 110. In some examples, each participant in the hangout can browse the document 542 independently but only the owner can edit the document 542. In some other examples, the document 542 is concurrently viewable by the hangout participants but editing is done by one participant at a time.

In some examples, the document is associated with an access control list. The access control list controls who can access the document (e.g., to read the document). For example, an access control list may specify that the document is accessible to particular circles among the document owner's various circles of social network subscribers. In some examples, when a document is shared by a participant with other participants in the hangout, the other participants are automatically added to the access control list of the document as users allowed to access (e.g., read) the document.

Also displayed in FIG. 5J are follow button 544, present button 546, and documents button 548. The participant user can select follow button 544 to follow the document owner. In some examples, following the document owner includes adding the document owner to the participant user's network of social network subscribers. The participant user can select present button 546 to take over editing of the document 542. The participant user can select documents button 548 to activate a document selection prompt for selecting another document to present to the hangout participants. The participant user can also select present files link 522-5 to open a document selection prompt for selecting a document to present to the hangout participants.

Figure 5K:
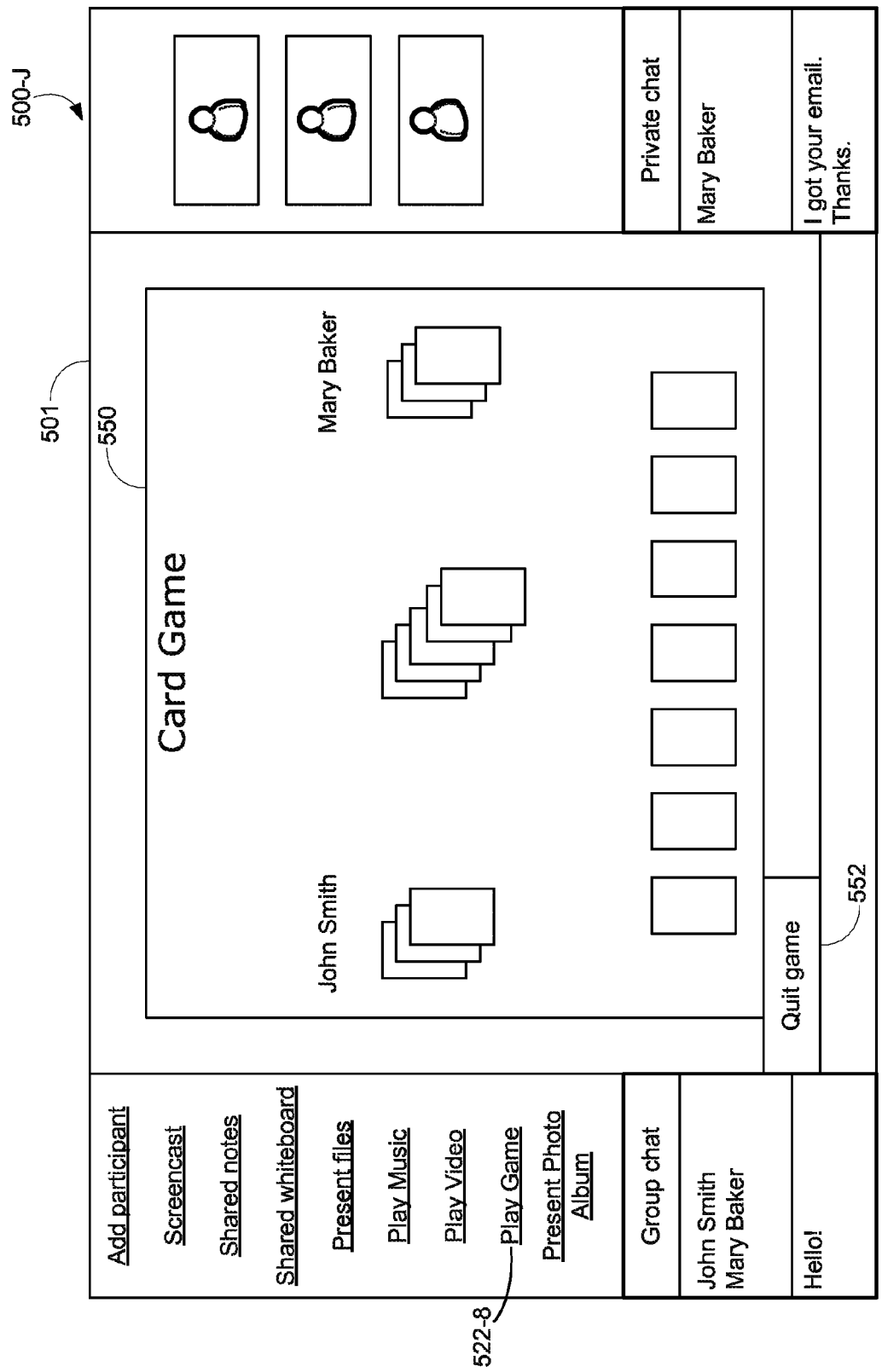

FIG. 5K illustrates a hangout user interface 500-K, which includes a game area 550 being displayed in the content panel 501. In game area 550, a game is being played between some or all of the participants in the hangout. In some examples, a participant can choose to join in a respective game as a spectator or as a player (i.e., as an active participant). In FIG. 5K, game area 550 shows a card game being played between John, Mary, and the participant user. A quit game button 552 is also displayed. The participant user can select the quit game button 552 to quit playing the game (and choose to be a mere spectator to the rest of the game or leave the game entirely).

Any participant in the hangout can initiate a game with other participants in the hangout by selecting play game link 522-8. In response to selection of the play game link 522-8, the initiating participant is shown a user interface (not shown) where the participant can select a game and invite both participants in the hangout and social network subscribers not in the hangout to join in the game as player or spectator (the subscribers not in the hangout who accept the invitation also enter the hangout as a result).

Figure 5L:
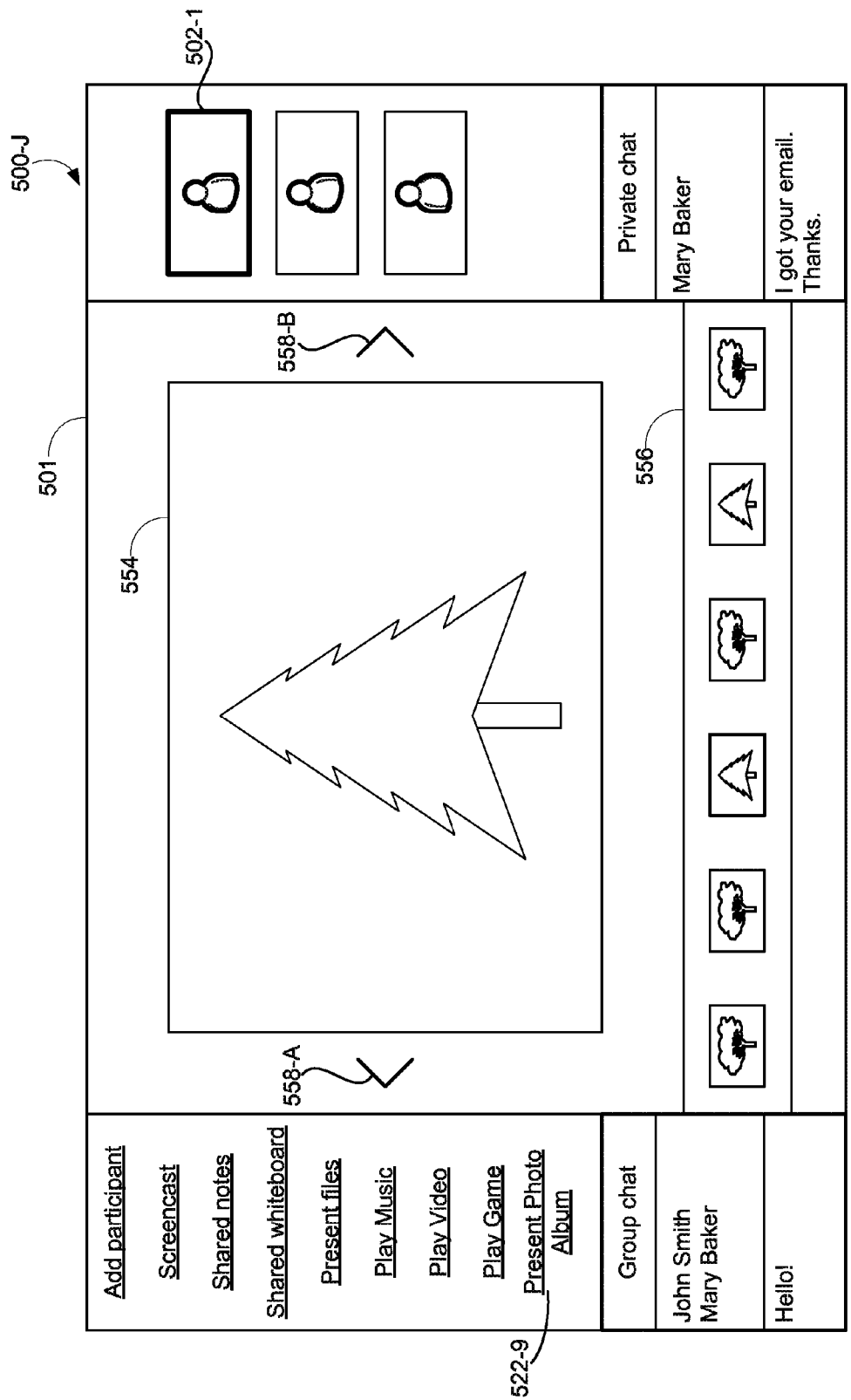

FIG. 5L illustrates a hangout user interface 500-L, which includes a digital photograph or image 554 being displayed in the content panel 501. Digital photograph/image 554 is one photo/image in an album 556 of one or more photos/images presented by one of the participants (in FIG. 5L, the presenter of the photos is John, as indicated by the highlighted thumbnail 502-1) to the other participants. The photos in the album 556 can come from the sharing participant's client system 104 or an online photo album associated with the sharing participant. In some examples, each participant in the hangout that is viewing the photos in the album 556 can independently scroll through the photos; each viewing participant can view them at his own pace. The participant user can use arrows 558-A and 588-B to scroll through the photos in the album 556. In some other examples, the presenter of the album 556 controls the scrolling through the photos in the album. Alternatively, in some examples a respective participant in the hangout can choose whether to follow the presenter of the album 556, in which case the content shown in the content panel 501 is controlled by the presenter, or to independently scroll through the photos in the album, in which case the content shown in the content panel 501 is controlled by the respective participant.

A respective participant (e.g., the participant user) in the hangout can initiate a process to present an album (or more generally, one or more photos/images) by selecting present photo album link 522-9. In response to selection of the present photo album link 522-9, the participant is shown a user interface (not shown) where the participant can select one or more photos/images to present to the other hangout participants.

In some examples, the contents that are shared amongst the participants in the hangout are retained by the social network server system 108 (e.g., in collaboration space status and history 340, FIG. 3) so that they can be viewed by participants in the hangout at future times. For example, group chat logs, contents in the whitespace area 528 or notes area 534, and shared video clips are retained for later review.

Example Operations to Provide an Online Collaboration Space

Figure 6:
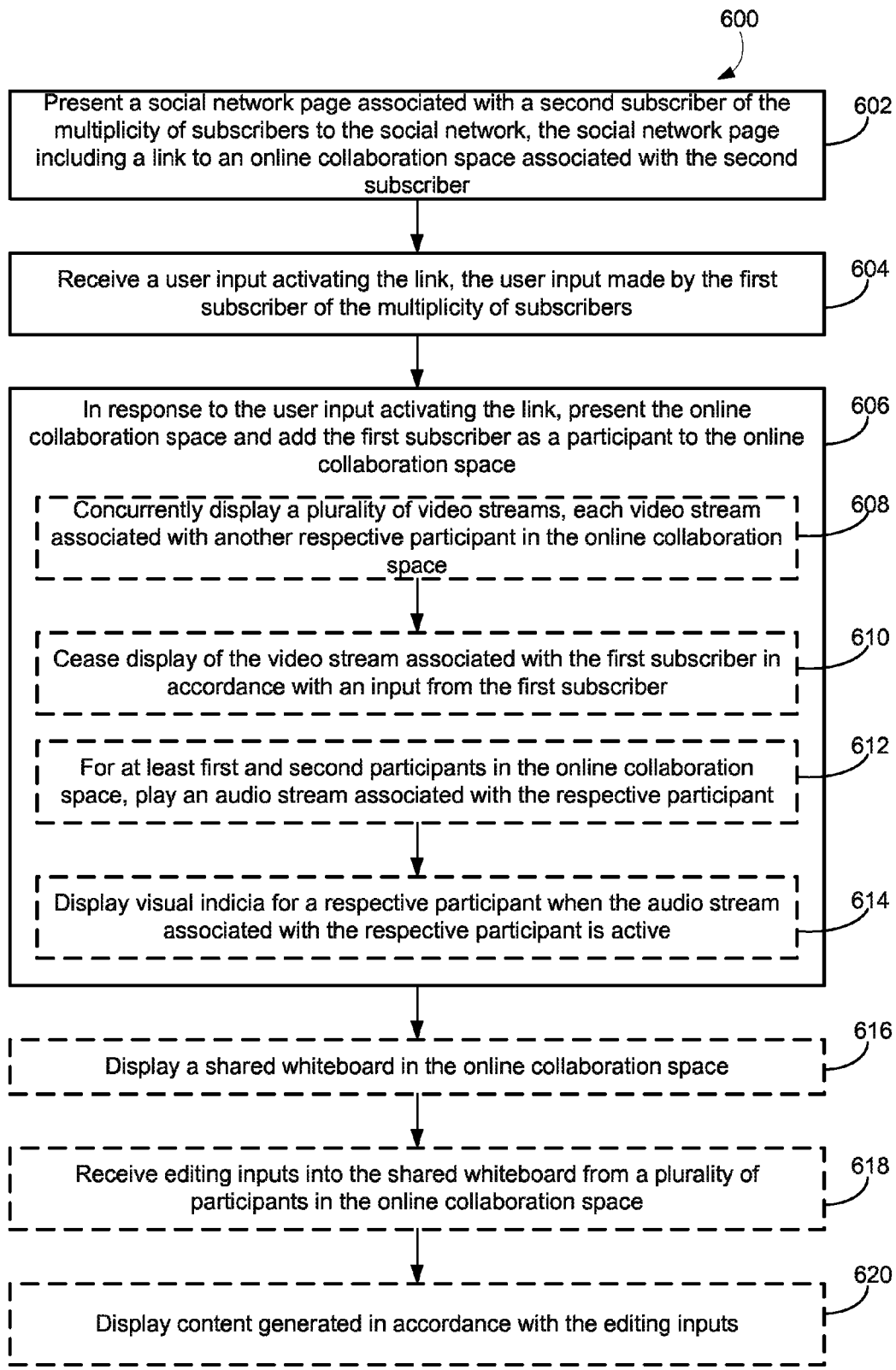
FIG. 6 illustrates a flow diagram of a process for displaying an online collaboration space, in accordance with some examples.

FIG. 6 illustrates a flow diagram of a process 600 for displaying an online collaboration space, in accordance with some examples. Each of the operations shown in FIG. 6 corresponds to instructions stored in a computer memory or computer readable storage medium. Process 600 is performed by a client system (e.g., client system 104) associated with a first subscriber of a multiplicity of subscribers to a social network.

The client system presents a social network page associated with a second subscriber of the multiplicity of subscribers to the social network (602). The social network page includes a link to an online collaboration space associated with the second subscriber. For example, social network page 400 (FIGS. 4A, 4B) associated with John Smith includes a link 414 to John Smith's online collaboration space/hangout.

The client system receives a user input activating the link, the user input made by the first subscriber of the multiplicity of subscribers (604). The first subscriber, at the client device, selects the link 414 to the hangout to activate the link 414.

In response to the user input activating the link, the client system presents the online collaboration space and adds the first subscriber as a participant to the online collaboration space (606). In some examples, the client system sends an http request to the social network server system in response to the user input activating the link, and receives a web page and/or the information needed to present the online collaboration space. The http request also functions as a request to the social network server system to add the first subscriber as a participant to the online collaboration space. In other examples, a request is sent to the social network server system using a different protocol than http to obtain the information needed to present the online collaboration space. In response to activation of the link 414, the client system displays (presents) a user interface for the online collaboration space, also called a social network hangout or online hangout (e.g., hangout user interface 500, FIG. 5A) on the display (e.g., display 206). The first subscriber is added to the hangout as a participant. For example, in FIG. 5A, the first subscriber takes the role of the participant user who self-invited himself into the hangout and is presented with the hangout user interface 500 as a result.

In some examples, presenting the online collaboration space includes concurrently displaying a plurality of video streams, each video stream associated with a respective participant in the online collaboration space (608). A video stream for each of the hangout participants (or at least those who have webcams and who have not disabled their webcam feeds) is displayed in the hangout user interface 500. In some examples, one or more of the video streams are displayed as thumbnails. For example, in FIG. 5A, thumbnails 502-1, 502-2, and 502-3 are displayed in the hangout user interface 500 for participants John, Mary, and the participant user, respectively.

In some examples, the client system ceases display of the video stream associated with the first subscriber in accordance with an input from the first subscriber (610). If the participant user selects block camera button 516 (FIG. 5A), his webcam feed is disabled. The video stream showing the participant user's webcam feed, thumbnail 502-3, is blacked out, as shown in FIG. 5C. From the perspectives of the other participants, the video stream is blacked out as well. For example, in FIG. 5D, when John's webcam feed is disabled, the participant user is shown a blacked out video stream for John.

In some examples, presenting the online collaboration space includes, for at least first and second participants in the online collaboration space, playing an audio stream associated with another respective participant in the online collaboration space (612). The audio stream can include speech from a participant (i.e., the participant is talking to the other participants) or music streamed from the client system associated with a participant. Thus, the client system may play the audio stream from any one of the other participants who is talking, where the audio stream is captured by the respective audio capture device/microphone 211 at the other participant's client system, as shown in FIG. 5A (playing John's audio stream) and in FIG. 5B (playing Mary's audio stream), for example.

In some examples, presenting the online collaboration space includes displaying visual indicia for a respective participant when the audio stream associated with the respective participant is active (614). When the audio stream associated with a participant is active (e.g., the participant is talking), visual indicators of the active audio stream are displayed to the other participants so that they know the origin of the active audio stream. For example, in FIG. 5A, icon 520-1 is displayed over thumbnail 502-1, indicating that the audio stream corresponding to John is active. Optionally, a status message to the same effect is displayed in status bar 510.

In some examples, the client system displays a shared whiteboard in the online collaboration space (616). A whiteboard area 528 is displayed in the content panel 501 of the hangout user interface 500-E, as shown in FIG. 5E. The whiteboard area 528 is a shared area. In some implementations, the hangout participants can all view, add, and modify content in the whiteboard area 528. In other implementations, while all participants can view the whiteboard area 528, only a subset of the participants (e.g., participants designated by the owner of the online collaboration space) can add and modify content in the whiteboard area 528.

Editing inputs into the shared whiteboard are received from a plurality of participants in the online collaboration space (618). The client system displays content generated in accordance with the editing inputs (620). As described above, the hangout participants can view, add, and modify content in the whiteboard area 528. Drawing tools 530 are available to the participants to draw objects and add text boxes onto the whiteboard area 528. For example, FIG. 5E shows object 532-1 and 532-2 on the whiteboard area 528. In this example, objects 532-1 and 532-2 are the result of the participants making drawing inputs and modification inputs to objects on the whiteboard area 528. In some examples, other types of content, such as drawings, photos, and/or tables, can be added to the whiteboard area 528 through the use of corresponding affordances displayed in the hangout user interface.

Example Operations to Provide an Online Collaboration Space

Figure 7A:
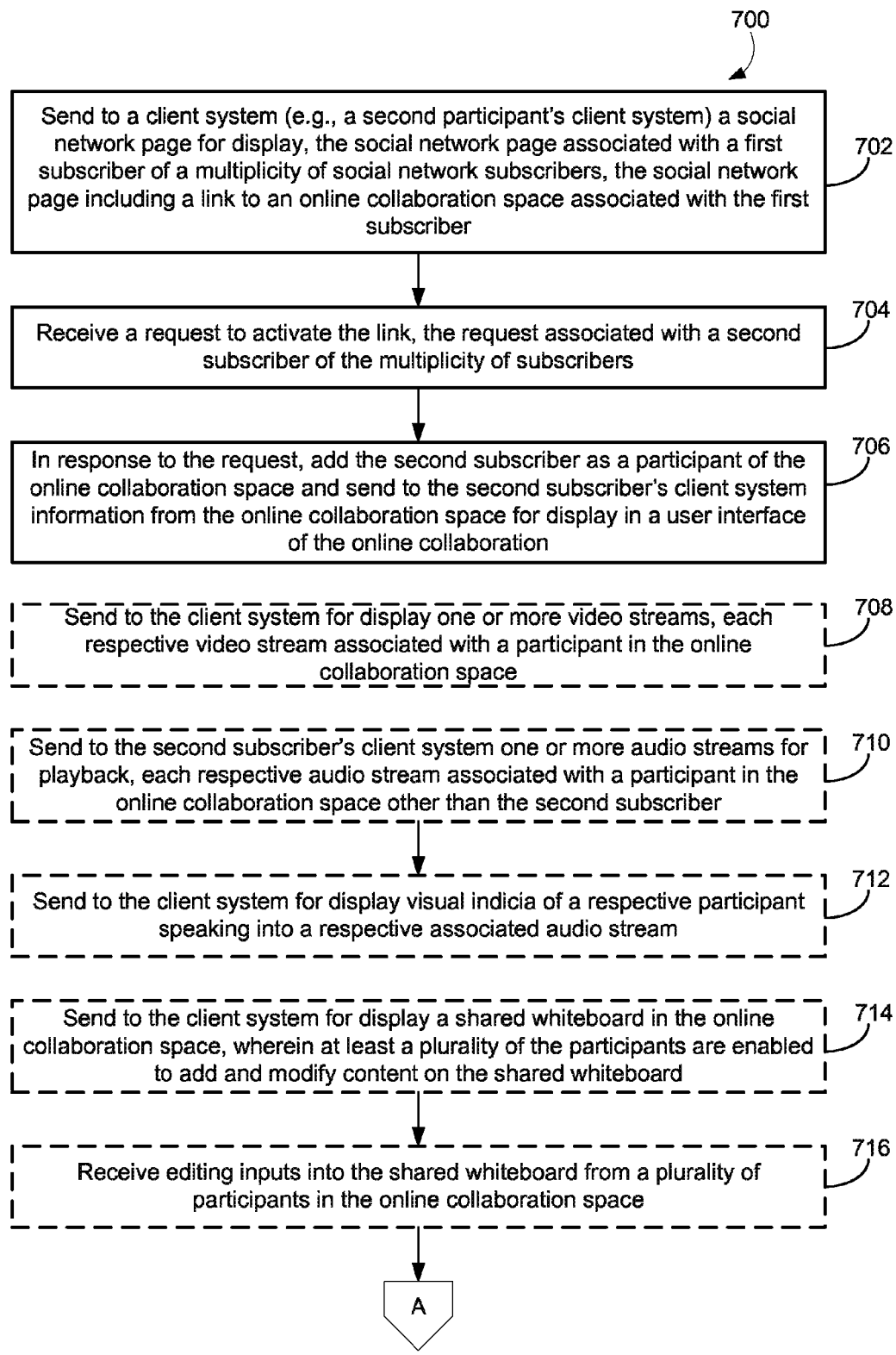
FIGS. 7A-7B illustrate flow diagrams of a process for providing an online collaboration space, in accordance with some examples.
Figure 7B:
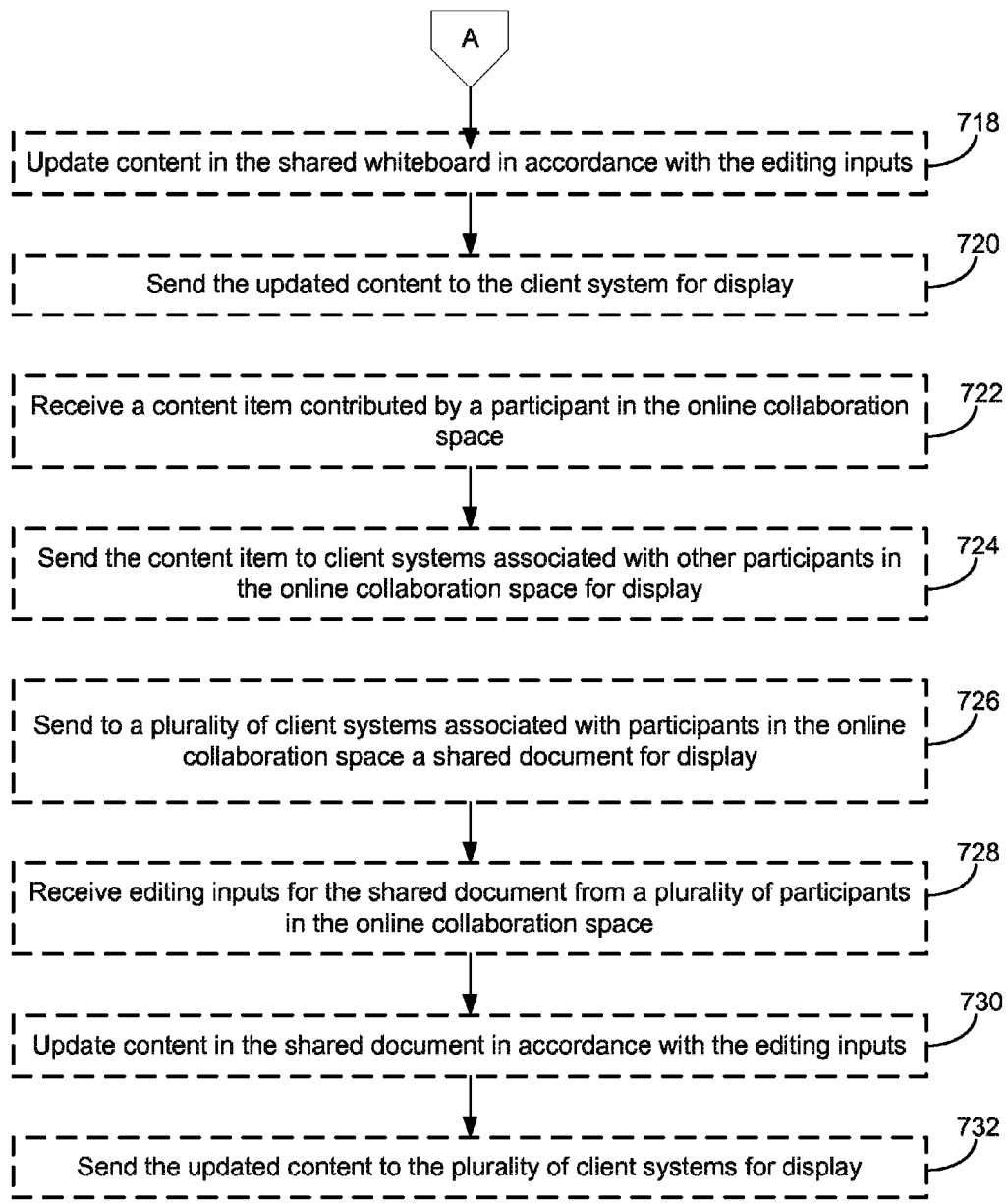

FIGS. 7A-7B illustrate flow diagrams of a process 700 for providing an online collaboration space, in accordance with some examples. FIGS. 7A-7B correspond to instructions stored in a computer memory or computer readable storage medium. The process 700 is performed by a server system (e.g., social network server system 108).

The server system sends to a client system a social network page for display (702). The social network page is associated with a first subscriber of a multiplicity of social network subscribers, and includes a link to an online collaboration space associated with the first subscriber. For example, the social network page 400 (FIG. 4A) is associated with subscriber "John Smith" in a social network and includes a link 414 to a social network hangout owned by John Smith.

The server system receives a request to activate the link (704). The request is associated with a second subscriber of the multiplicity of subscribers. For example, a subscriber other than John Smith, viewing social network page 400 (FIG. 4A), clicks on link 414. The social network server system 108 receives the click as a request (e.g., an http request, sent by the second subscriber's client system 104) to activate the link 414.

In response to the request, the server system adds the second subscriber as a participant to the online collaboration space and sends to the second subscriber's client system information from the online collaboration space for display in a user interface of the online collaboration space (706). In response to the request to activate link 414, the social network server system 108 activates the link 414 and sends to client system 104 of the subscriber who clicked on the link 414 the online collaboration space module 230. The web browser 226 at client system 104 executes the online collaboration space module 230 and renders it onto the display 206 of the second subscriber's client system 104. The result is that a hangout user interface 500 is displayed, with the subscriber who clicked on the link 414 added to the hangout (i.e., the online collaboration space) as a participant. The displayed hangout user interface includes at least a subset of the information in the online collaboration space of the first subscriber.

In some examples, the server system sends to the second participant's client system one or more video streams for display, each respective video stream associated with a participant in the online collaboration space (708). The social network server system 108 receives video content (e.g., live webcam feeds) from client systems 104 corresponding to the hangout participants, and the video streaming module 332 (FIG. 3) in the social network server system 108 sends (e.g., by streaming) the video content to the client systems corresponding to the participants. Thus, if the video content is live webcam feeds, the participants can see each other through the video streams.

In some examples, the server system sends to the second participant's client system one or more audio streams for playback, each respective audio stream associated with a participant in the online collaboration space other than the second subscriber (710). The social network server system 108 may receive audio content (e.g., speech captured from participants talking into their respective audio capture devices/microphones 211) from client systems 104 corresponding to the hangout participants, and the audio streaming module 334 (FIG. 3) in the social network server system 108 sends (e.g., by streaming) the audio content to the client systems corresponding to the participants. The audio streaming module 334 may omit sending an audio stream from a participant to the participant himself (or more particularly, the participant's client system 104); an audio stream need not be sent to the audio stream's originating client system, since the participant can, for example, hear himself talk without the assistance of the audio stream.

In some examples, the social network server system 108 sends a plurality of separate audio streams to a participant. In some other examples, the social network server system 108 sends a single combined audio stream.

In some examples, the server system sends to the client system for display visual indicia of a respective participant speaking into a respective associated audio stream (712). When a participant in the hangout is talking and the speech is streamed to the other participants, one or more visual indicators of the participant talking (e.g., icon 520-1, a status message in status bar 510) are displayed at the client systems 104 of the participants in accordance with instructions from the social network server system 108.

In some examples, the server system sends to the client system for display a shared whiteboard in the online collaboration space, wherein at least a plurality of the participants are enabled to add and modify content on the shared whiteboard (714). In response to participants clicking on the shared whiteboard link 522-4 (FIG. 5E) to access the whiteboard area 528 (FIG. 5E), the social network server system 108 sends the shared whiteboard and its contents to the client systems 104 of the participants. The shared whiteboard is displayed as the whiteboard area 528 in the content panel 501.

The server system receives editing inputs to the shared whiteboard from a plurality of participants in the online collaboration space (716), updates content in the shared whiteboard in accordance with the editing inputs (718), and sends the updated content to the client system for display (720). Participants in the hangout can add or modify content in the shared whiteboard. For example, they can use drawing tools corresponding to buttons 530 to input graphical objects and text to the whiteboard area 528. The inputs are received by the social network server system 108 and the contents of the whiteboard area 528 are updated accordingly. The updated contents of the whiteboard area 528 are sent to the client systems of the participants for display to the participants.

In some examples, the server system receives a content item contributed by a participant in the online collaboration space (722). The server system sends the content item to client systems associated with other participants in the online collaboration space for display (724). The social network server system 108 can receive content (e.g., a document, photos, etc.) from the client system 104 of a participant who wishes to share said content with the other participants. The social network server system 108 sends the received content to the other client systems 104 for display.

For example, FIG. 5L shows photos from a participant being displayed in the hangout user interface 500-L.

In some examples, the server system sends to a plurality of client systems associated with participants in the online collaboration space a shared document for display (726), receives editing inputs for the shared document from a plurality of participants in the online collaboration space (728), updates content in the shared document in accordance with the editing inputs (730), and sends the updated content to the plurality of client systems for display (732). The social network server system 108 sends to the client systems of the participants a shared document (e.g., contents of notes area 534, FIG. 5F) for display. The participants in the hangout can all add or modify content in the shared document. For example, they can enter input to add or edit text in the notes area 534. The inputs are received by the social network server system 108 and the contents of the notes area 534 are updated accordingly. The updated contents of the notes area 534 are sent to the client systems of the participants for display to the participants.

In some examples, the shared document can be a document shared by a participant from the participant's client system 104 or from a document server (e.g., shared content server system 110). When the document is shared from the participant's client system or from a document server, an access control list of the document is updated to make the document public (anyone can access it) or to include participants in the hangout as permissible readers.

For situations in which the systems discussed above collect information about users, the users may be provided with an opportunity to opt in/out of programs or features that may collect personal information (e.g., information about a user's preferences or a user's contributions to social content providers). In addition, in some examples, certain data may be anonymized in one or more ways before it is stored or used, so that personally identifiable information is removed. For example, a user's identity may be anonymized so that the personally identifiable information cannot be determined or associated for the user and so that identified user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific examples. The examples were chosen and described in order to best explain the principles of the invention and its practical applications, to thereby enable others skilled in the art to best utilize the invention and various examples with various modifications as are suited to the particular uses contemplated. However, the illustrative discussions above are not intended to be exhaustive or to limit the invention to the precise forms disclosed. Many modifications and variations are possible in view of the above teachings.

What is claimed is:

1. A method, comprising:
   at a client device associated with a first subscriber of a multiplicity of subscribers to a social network:
   presenting a social network page associated with a second subscriber of the multiplicity of subscribers to the social network, the social network page including a content feed and a link to a virtual location associated with the second subscriber in which subscribers to the social network can engage in conversation and share information in real-time, wherein the content feed includes updates and posts posted by the second subscriber and indicates when the second subscriber is actively present in the virtual location associated with the second subscriber;
   receiving a user input activating the link, the user input made by the first subscriber of the multiplicity of subscribers; and
   in response to the user input activating the link, presenting the virtual location and adding the first subscriber as a participant to the virtual location.

2. The method of claim 1, wherein presenting the virtual location comprises:
   concurrently displaying a plurality of video streams, each video stream associated with a respective participant in the virtual location.

3. The method of claim 2, further comprising:
   ceasing display of the video stream associated with the first subscriber in accordance with an input from the first subscriber.

4. The method of claim 1, wherein presenting the virtual location comprises:
   for at least first and second participants in the virtual location, playing an audio stream associated with the respective participant.

5. The method of claim 4, wherein presenting the virtual location comprises:
   displaying visual indicia for a respective participant when the audio stream associated with the respective participant is active.

6. The method of claim 1, further comprising:
   displaying a shared whiteboard in the virtual location;
   receiving editing inputs into the shared whiteboard from a plurality of participants in the virtual location; and
   displaying content generated in accordance with the editing inputs.

7. A server system, comprising:
   one or more processing units;
   memory storing one or more programs for execution by the one or more processing units;
   the one or more programs comprising instructions for performing the method of claim 1.

8. A non-transitory computer readable storage medium storing one or more programs configured for execution by a computer, the one or more programs comprising instructions for performing the method of claim 1.

9. A method, comprising:
   at a server system having one or more processors and memory storing one or more programs for execution by the one or more processors:
   sending to a client system for display a social network page associated with a first subscriber of a multiplicity of social network subscribers, the social network page including a content feed and a link to a virtual location associated with the first subscriber in which subscribers to the social network can engage in conversation and share information in real-time, wherein the content feed includes updates and posts posted by the first subscriber and indicates when the first subscriber is actively present in the virtual location associated with the first subscriber;
receiving a request to activate the link, the request associated with a second subscriber of the multiplicity of subscribers; and
in response to the request, adding the second subscriber as a participant of the virtual location and sending to a client system for display at least a subset of content items in the virtual location.

10. The method of claim 9, further comprising:
sending to the client system for display one or more video streams, each respective video stream associated with a participant in the virtual location.

11. The method of claim 9, further comprising:
sending to the client system for playback one or more audio streams, each respective audio stream associated with a participant in the virtual location other than the second subscriber.

12. The method of claim 11, further comprising:
sending to the client system for display visual indicia of a respective participant speaking into a respective associated audio stream.

13. The method of claim 9, further comprising:
sending to the client system for display a shared whiteboard in the virtual location, wherein at least a plurality of the participants are enabled to add and modify content on the shared whiteboard.

14. The method of claim 13, further comprising:
receiving editing inputs into the shared whiteboard from a plurality of participants in the virtual location;
updating content in the shared whiteboard in accordance with the editing inputs; and
sending the updated content to the client system for display.

15. The method of claim 9, further comprising:
receiving a content item contributed by a participant in the virtual location; and
sending the content item to client systems associated with other participants in the virtual location for display.

16. The method of claim 9, further comprising:
sending to a plurality of client systems associated with participants in the virtual location a shared document for display;
receiving editing inputs for the shared document from a plurality of participants in the virtual location;
updating content in the shared document in accordance with the editing inputs; and sending the updated content to the plurality of client systems for display.

17. The method of claim 9, further comprising:
sending to a second client system for display, the social network page associated with the first subscriber of a multiplicity of social network subscribers, wherein the social network page includes a posting that indicates the second subscriber was added as a participant of the virtual location.

18. A server system comprising:
one or more processing units;
memory storing one or more programs to be executed by the one or more processing units; and
for each respective subscriber of a multiplicity of subscribers to a social network, a social network page, the social network page including a content feed and a link to a virtual location associated with the respective subscriber in which subscribers to the social network can engage in conversation and share information in real-time;
wherein the content feed includes updates and posts posted by the respective subscriber and indicates when the respective subscriber is actively present in the virtual location associated with the respective subscriber;
wherein the social network page of the respective subscriber is accessible to at least a subset of the other subscribers of the social network; and
wherein activation of the virtual location link by a subscriber adds the subscriber as a participant of the virtual location and causes information from the virtual location to be sent to a client device of the subscriber for display in a user interface of the virtual location.

19. The system of claim 18, wherein the virtual location includes:
for at least first and second participants in the virtual location, an audio stream associated with the respective participant.

20. The system of claim 19, wherein the user interface of the virtual location includes:
visual indicia for a respective participant when the audio stream associated with the respective participant is active.

21. The system of claim 19, wherein the user interface of the virtual location includes:
a muting affordance for muting, at the client device of a respective subscriber who activates the muting affordance, the audio stream of a respective participant in the virtual location.

22. The system of claim 18, wherein the virtual location includes:
for at least first and second participants in the virtual location, a video stream associated with the respective participant;
wherein the respective video streams are displayed concurrently in the user interface of the virtual location.

23. The system of claim 22, wherein the user interface of the virtual location includes:
a video presentation affordance for displaying a video presentation of stored video content in the video stream of a respective participant concurrently with the video streams of the other participants.

24. The system of claim 22, wherein the user interface of the virtual location includes:
a video blocking affordance for blocking transmission of a webcam video stream from a client device of a respective participant to other participants of the virtual location.

25. The system of claim 18, wherein the virtual location includes:
received content contributed by one or more of the participants.

26. The system of claim 25, wherein the user interface of the virtual location includes:
a plurality of affordances for adding content to the virtual location.

27. The system of claim 26, wherein the content comprises one or more of: video, audio, and images.

28. The system of claim 18, wherein the user interface of the virtual location includes:
a whiteboard affordance for displaying a collaborative whiteboard in the virtual location, wherein at least a plurality of the participants are enabled to add and modify content on the shared whiteboard.

29. The system of claim 18, wherein the user interface of the virtual location includes:

music affordance for playing music to the participants in the virtual location.

30. The system of claim 18, wherein the social network page associated with the subscriber includes a posting that indicates the subscriber was added as a participant of the virtual location.

\* \* \* \* \*